(12) United States Patent
D'Alessandro

(10) Patent No.: US 11,380,328 B2
(45) Date of Patent: Jul. 5, 2022

(54) CONTEXT-SENSITIVE CONVERSATIONAL INTERFACE

(71) Applicant: LIVEPERSON, INC., New York, NY (US)

(72) Inventor: Angelo D'Alessandro, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 17/459,552

(22) Filed: Aug. 27, 2021

(65) Prior Publication Data

US 2022/0068274 A1 Mar. 3, 2022

Related U.S. Application Data

(60) Provisional application No. 63/071,140, filed on Aug. 27, 2020.

(51) Int. Cl.
| | | |
|---|---|---|
| *G10L 15/22* | (2006.01) | |
| *G10L 15/18* | (2013.01) | |
| (Continued) | | |

(52) U.S. Cl.
CPC .......... *G10L 15/22* (2013.01); *G06F 16/3322* (2019.01); *G10L 15/16* (2013.01); *G10L 15/1815* (2013.01); *G10L 2015/223* (2013.01)

(58) Field of Classification Search
CPC ..... G10L 15/22; G10L 15/16; G10L 15/1815; G10L 2015/223; G06F 16/3322
See application file for complete search history.

(56) References Cited

U.S. PATENT DOCUMENTS 10,811,004 B2   10/2020  Peters et al.
11,080,714 B2 *  8/2021  Matteson ............. G06Q 20/401
(Continued)

FOREIGN PATENT DOCUMENTS

KR   101409868 B1 *  1/2014  ............. G06Q 10/04

OTHER PUBLICATIONS

International Search Report and Written Opinion dated Dec. 22, 2021 for PCT Application No. PCT/US2021/047994, 9 pages.

(Continued)

*Primary Examiner* — Michael Colucci
(74) *Attorney, Agent, or Firm* — Polsinelli LLP

(57) ABSTRACT

A context-aware account management system is described. The system receives a partial request and parses the partial request to identify one or more characters in the partial request. The system determines a plurality of valid requests that include the one or more characters, for instance in response to querying one or more data structures and/or generating the valid requests using a trained machine learning model. The system generates a suggested request by selecting one of the plurality of valid requests, and in some cases, by identifying valid values for variables within the selected one of the plurality of valid requests by querying one or more data structures and/or generating the valid values using a trained machine learning model. The system outputs the suggested request and receives a confirmation in response. The system performs an action indicated by the suggested request using a user account indicated by the suggested request.

73 Claims, 14 Drawing Sheets

(51) Int. Cl.
*G06F 16/332* (2019.01)
*G10L 15/16* (2006.01)

(56) References Cited

U.S. PATENT DOCUMENTS

| | | | | |
|---|---|---|---|---|
| 2009/0222308 A1* | 9/2009 | Zoldi | ................... | G06Q 40/025 |
| | | | | 705/30 |
| 2011/0060587 A1* | 3/2011 | Phillips | ................... | G10L 15/30 |
| | | | | 704/235 |
| 2012/0023120 A1* | 1/2012 | Kanefsky | .............. | G06F 16/951 |
| | | | | 707/E17.014 |
| 2014/0297282 A1* | 10/2014 | Peters | ...................... | G10L 15/19 |
| | | | | 704/254 |
| 2015/0193263 A1* | 7/2015 | Nayyar | .................. | G06Q 10/06 |
| | | | | 707/703 |
| 2015/0347381 A1* | 12/2015 | Bellegarda | ............ | G06F 40/274 |
| | | | | 704/9 |
| 2019/0214024 A1 | 7/2019 | Gruber et al. | | |
| 2019/0325042 A1 | 10/2019 | Yu et al. | | |
| 2021/0399999 A1* | 12/2021 | Soiaporn | .............. | G06K 9/6218 |

OTHER PUBLICATIONS

Martins F M et al., "Archetype-oriented user interfaces" Computers and Graphics, Elsevier, GB, vol. 14, No. 1, Jan. 1, 1990, 12 pages.

* cited by examiner

CONTEXT-SENSITIVE CONVERSATIONAL INTERFACE

CROSS-REFERENCE TO RELATED APPLICATIONS

The present application claims the priority benefit of U.S. provisional application No. 63/071,140 filed Aug. 27, 2020 and entitled "Context-Sensitive Conversational Interface," the entire contents of the which is hereby incorporated herein by reference.

BACKGROUND

Field of the Technology

The present technology generally pertains to a context-sensitive interactive interface. More specifically, the present invention pertains to a context-sensitive interactive conversational interface for user account and asset management.

Description of the Related Art

Account and asset management, such as changes in settings of an account or transfers of ownership of assets between accounts, can be confusing processes for users, and one in which mistakes can have dangerous consequences. For example, users wanting to transfer assets from an account associated with one institution to another account associated with another institution may need to interact with different processes, interfaces, settings, and account types from both institutions that can complicate the process and lead to improper transfers, incompatibilities, poor security, or even loss of assets. There is a need in the art for improved interfaces for account management.

SUMMARY

Systems, apparatuses, methods, and computer-readable media are described for context-sensitive interactive conversational interface for user account management. A system receives a partial request and parses the partial request to identify one or more characters in the partial request. The system determines a plurality of valid requests that include the one or more characters, for instance in response to querying one or more data structures and/or generating the valid requests using a trained machine learning model. The system generates a suggested request by selecting one of the plurality of valid requests, and in some cases, by identifying valid values for variables within the selected one of the plurality of valid requests by querying one or more data structures and/or generating the valid values using a trained machine learning model. The system outputs the suggested request and receives a confirmation in response. The system performs an action indicated by the suggested request using a user account indicated by the suggested request.

According to at least one example, a method is provided for device function. The method includes: receiving a partial request that includes one or more characters; parsing the partial request to identify the one or more characters; determining a plurality of valid requests that include the one or more characters of the partial request based on the partial request and based on a data structure; generating a suggested request by selecting one of the plurality of valid requests, the suggested request indicating an action to be performed using a user account; sending the suggested request; receiving a confirmation associated with the suggested request; and performing the action indicated by the suggested request using the user account.

In another example, an apparatus for device function is provided that includes a memory (e.g., configured to store data, such as virtual content data, one or more images, etc.) and one or more processors (e.g., implemented in circuitry) coupled to the memory. The one or more processors are configured to and can: receive a partial request that includes one or more characters; parse the partial request to identify the one or more characters; determine a plurality of valid requests that include the one or more characters of the partial request based on the partial request and based on a data structure; generate a suggested request by selecting one of the plurality of valid requests, the suggested request indicating an action to be performed using a user account; sending the suggested request; receive a confirmation associated with the suggested request; and perform the action indicated by the suggested request using the user account.

In another example, a non-transitory computer-readable medium is provided that has stored thereon instructions that, when executed by one or more processors, cause the one or more processors to: receive a partial request that includes one or more characters; parse the partial request to identify the one or more characters; determine a plurality of valid requests that include the one or more characters of the partial request based on the partial request and based on a data structure; generate a suggested request by selecting one of the plurality of valid requests, the suggested request indicating an action to be performed using a user account; sending the suggested request; receive a confirmation associated with the suggested request; and perform the action indicated by the suggested request using the user account.

In another example, an apparatus for device function is provided. The apparatus includes: means for receiving a partial request that includes one or more characters; means for parsing the partial request to identify the one or more characters; means for determining a plurality of valid requests that include the one or more characters of the partial request based on the partial request and based on a data structure; means for generating a suggested request by selecting one of the plurality of valid requests, the suggested request indicating an action to be performed using a user account; sending the suggested request; means for receiving a confirmation associated with the suggested request; and means for performing the action indicated by the suggested request using the user account.

In some aspects, one or more of the methods, apparatuses, and computer-readable medium described above further comprise: querying the data structure for the one or more characters of the partial request; and receiving the plurality of valid requests that include the one or more characters of the partial request in response to querying the data structure.

In some aspects, one or more of the methods, apparatuses, and computer-readable medium described above further comprise: generating the plurality of valid requests using one or more trained machine learning models based on using the partial request as an input to the one or more trained machine learning models, the one or more trained machine learning models having been trained based on information from the data structure. In some aspects, one or more of the methods, apparatuses, and computer-readable medium described above further comprise: using the suggested request and the confirmation to update the one or more trained machine learning models.

In some aspects, one or more of the methods, apparatuses, and computer-readable medium described above further comprise: receiving a voice recording recorded by a microphone; and generating the partial request by parsing the voice recording into text.

In some aspects, a user device associated with the user account includes an input interface through which the partial request is received, wherein the input interface includes one or more buttons corresponding each of the one or more characters. In some aspects, each of the one or more buttons is a virtual button, wherein a touchscreen displays a button icon corresponding to the virtual button at a region of the touchscreen that receives a touch input corresponding to the virtual button using a touch-sensitive surface of the touchscreen.

In some aspects, the one or more characters of the partial request form a string of text that includes one or more words, wherein the plurality of valid requests include each of the one or more words.

In some aspects, the one of the plurality of valid requests includes a variable, and wherein generating the suggested request includes providing a value for the variable, wherein the value is associated with the user account.

In some aspects, one or more of the methods, apparatuses, and computer-readable medium described above further comprise: generating the value for the variable using one or more trained machine learning models based on using the one of the plurality of valid requests as an input to the one or more trained machine learning models. In some aspects, one or more of the methods, apparatuses, and computer-readable medium described above further comprise: using the suggested request and the confirmation to update the one or more trained machine learning models.

In some aspects, one or more of the methods, apparatuses, and computer-readable medium described above further comprise: identifying the value within a second data structure. In some aspects, one or more of the methods, apparatuses, and computer-readable medium described above further comprise: identifying the second data structure based on context associated with the partial request. In some aspects, the value matches a previous value used in one or more previous actions performed using the user account. In some aspects, the value is an account identifier corresponding to the user account, wherein the account identifier identifies at least one of an account type of the user account, an institution associated with the user account, and an alphanumeric code associated with user account. In some aspects, the value is a secondary account identifier corresponding to a secondary account, wherein performing the action includes transferring funds between the user account and the secondary account, wherein the secondary account identifier identifies at least one of an account type of the secondary account, an institution associated with the secondary account, and an alphanumeric code associated with the secondary account. In some aspects, the value is a numerical value, and wherein the second data structure identifies one or more previous transactions associated with the user account. In some aspects, performing the action includes transferring a quantity of an asset between the user account and a second account, the quantity of the asset based on the numerical value.

In some aspects, performing the action includes determining a balance stored in the user account and outputting the balance. In some aspects, performing the action includes opening the user account. In some aspects, performing the action includes closing the user account. In some aspects, performing the action includes transferring one or more assets from the user account to a transferee account. In some aspects, performing the action includes transferring one or more assets from a transferor account to the user account.

In some aspects, determining the plurality of valid requests and generating the suggested request occur in real-time while still receiving at least a subset of the one or more characters of the partial request. In some aspects, one or more of the methods, apparatuses, and computer-readable medium described above further comprise: updating at least one of the plurality of valid requests and the suggested request in real-time based on receipt of one or more edits to the partial request.

DETAILED DESCRIPTION

A context-aware account management system is described. The system receives a partial request and parses the partial request to identify one or more characters in the partial request. The system queries a data structure for the one or more characters in the partial request, and receives a plurality of valid requests that include the one or more characters in response to querying the data structure. The system generates a suggested request by selecting one of the plurality of valid requests, and in some cases, by querying additional data structures for valid values for variables within the selected one of the plurality of valid requests. The system sends the suggested request and receives a confirmation in response. The system performs an action indicated by the suggested request using a user account.

Figure 1:
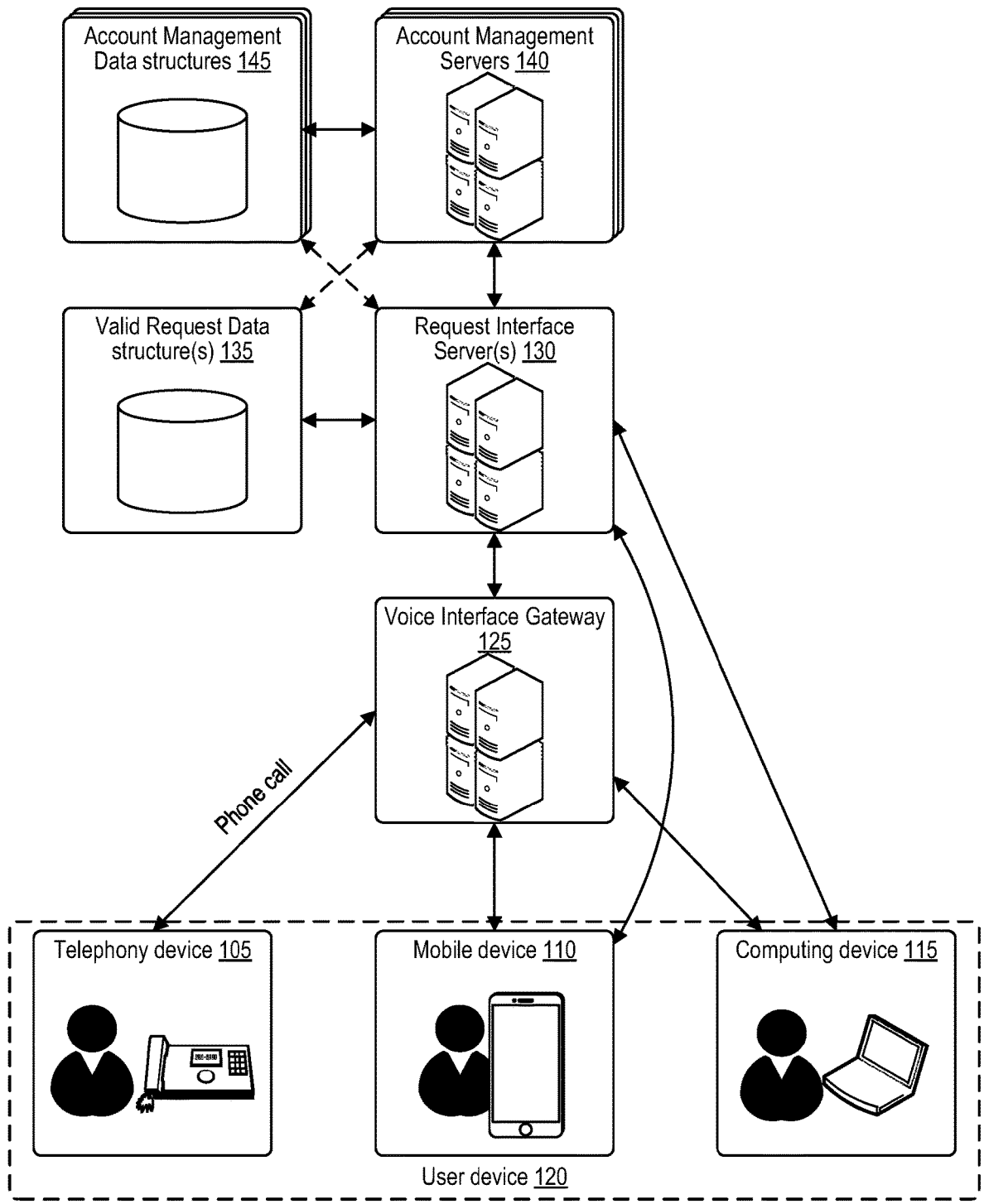
FIG. 1 is a block diagram illustrating a system architecture of a system for context-aware conversational account management, in accordance with some examples.

FIG. 1 is a block diagram illustrating a system architecture of a system for context-aware conversational account management. The system architecture includes various types of user devices 120. User devices 120 include telephony devices 105, such as landline telephones or cellular phones. User devices 120 include computing devices 115 such as desktop computers, laptop computers, or any other computing device 1400 discussed with respect to FIG. 14. User devices 120 include mobile devices 110, such as "smart" cellular phone devices. A user device 120 may be a combination of a telephony device 105, mobile device 110, and/or computing device 115.

The system architecture includes one or more voice interface gateway 125 servers, one or more request interface servers 130, one or more account management servers 140, one or more valid request data structures 135, and one or more account management data structures 145. The user device 120 may receive a request, or a partial request (i.e., part of a request), through an input interface, such as a physical keyboard or keypad with physical keys or buttons, a virtual keyboard or keypad with virtual keys or buttons on a touchscreen, a microphone that records a user's voice, another touchscreen interface, a touchpad, a mouse, any input device 1460 discussed with respect to FIG. 14, or some combination thereof.

If the input device used is a microphone, the microphone may record a voice recording of the user's voice, and a text-based request (or partial request) may be generated by parsing the voice recording into text. The parsing of the voice recording into text may occur at the user device 120, at the voice interface gateway 125, or some combination thereof. For instance, if the user device 120 engages in a phone call or voice-over-IP call with an automated assistant running on the voice interface gateway 125, a voice recording may be recorded during the phone call by the voice interface gateway 125, which may parse the voice recording into text and send the resulting request (or partial request) to the request interface servers 130.

The request interface servers 130, upon receiving a partial request, may query the valid request data structure 135 for one or more valid requests that include the partial request and/or that begin with the partial request. For instance, if the partial request reads "Please cha," the valid request data structure 135 may return "Please change my username" and "Please change my password" as valid requests that include and begin with the partial request. One of these valid requests may be selected by the request interface server 130, for instance based on which of the requests is most commonly requested by users generally, based on which of the requests is most commonly requested by this specific user, based on which of the requests is most commonly requested by users in a same area is as this specific user, based on which of the requests this specific user has made most recently, or some combination thereof. The selected one of the valid requests may be referred to as the suggested request. The suggested request may then be sent by the request interface server 130 to the user device 120 from which the request interface server 130 received the partial request, and output by the user device 120 to the user. For example, if a user typed the partial request reading "Please cha" into the user device 120, the user device 120 may receive the valid request "Please change my password" from the request interface server 130 and may display this valid request on a display screen to automatically complete the user's partial request.

The user device 120 can then receive a confirmation input from the user via the input interface, for example by the user tapping or clicking or saying "yes," to confirm that "Please change my password" was the user's intended request. The user device 120 may send an indication of confirmation to the request interface server 130, which may perform an action corresponding to the suggested request 265, in coordination with the account management servers 140 and/or account management data structures 145 in some cases. For instance, in response to receiving confirmation that suggested request "Please change my password" was the user's intended request, the request interface server 130 may send an indication to an account management server 140 to initiate a password change process, to identify what information the account management server 140 needs (e.g., the current password and the new password), request and receive that information from the user device 120, submit that information to the account management server 140 in order to change the user's password, and send the user an indication that the action has been completed.

In some cases, the request interface server 130 may send, and the user device 120 may receive, multiple options for valid requests, which the user may then select between. For instance, the user device 120 may receive from the request interface server 130, and may display, both "Please change my password" and "Please change my username." The user may then select one of these through the input interface of the user device 120, for instance by tapping, clicking, or verbally selecting "Please change my password." The process may then proceed.

The request interface server 130 can send the suggested request to the voice interface gateway 125, which may convert the suggested request from text to a machine-generated voice sample reading the suggested request aloud. For instance, if the partial request is "Please change," and the suggested request selected by the request interface server 130 is "Please change my password," then the voice interface gateway 125 may receive this suggested request, generate a voice sample that reads the suggested request aloud, and send the voice sample to the user device 120. If the user device 120 is engaged in a phone call with the voice interface gateway 125, the user device 120 may receive the suggested request as audio over the phone call inquiring "Did you mean to ask: Please change my password?" The user may then confirm by stating "yes," which the voice interface gateway 125 may interpret as a confirmation indicator that the voice interface gateway 125 sends to the request interface server 130. Further interactions between the request interface server 130 and the user device 120 may also pass through the voice interface gateway 125 similarly. The voice interface gateway 125 may convert any requests by the request interface server 130 for information to another voice sample before sending the voice sample to the user device 120. The voice interface gateway 125 may parse any information provided verbally by the user through the user device 120 into text and send it on to the request interface gateway 125.

In some cases, valid requests in the valid request data structure 135 may include variables. For example, one valid request in the valid request data structure 135 may read "I want to check the balance of my [$acct-type] account at [$institution]." The variables in this example request are "[$acct-type]" and "[$institution]." In situations where the request interface server 130 selects a valid request that includes a variable, a value for the variable may be selected from data in the same valid request data structure 135, a separate valid request data structure 135, an account management data structure 145, an account management server 140, a request interface server 130, the user device 120, or some combination thereof.

For instance, the request interface server 130 may request valid values for the account type variable [$acct-type] and the account institution variable [$institution] from an account management server 140 associated with at least one user account associated with the user. The account management server 140 may access and query one or more corresponding account management data structures 145 for account types that the user is associated with, and return the resulting list of account types to the request interface server 130 as possible values for the account type variable [$acct-type]. Similarly, the account management server 140 may access and query one or more corresponding account management data structures 145 for account institutions that the user is associated with, and return the resulting list of account types to the request interface server 130 as possible values for the account type variable [$institution]. For example, the user may be associated with a savings account at "ABC bank," a checking account at "ABC bank," and a gift card account with "XYZ store." The account management server 140 may send to the request interface server 130 a list of "savings account," "checking account," and "gift card" as valid values for the account type variable [$acct-type]. The account management server 140 may send to the request interface server 130 a list of "ABC bank" and "XYZ store" as valid values for the account institution variable [$institution].

Generating the suggested request may include selecting one of the valid requests from the valid request data structure 135 as discussed above, and may also include finding and plugging in values for variables in a selected valid request. For instance, if the selected one of the valid requests reads "I want to check the balance of my [$acct-type] account at [$institution]," and the request interface server 130 receives "savings account," "checking account," and "gift card" as valid values for the account type variable [$acct-type], then the request interface server 130 can select "savings account" for the account type variable [$acct-type]. Similarly, if the request interface server 130 receives "ABC bank" and "XYZ store" as valid values for the account institution variable [$institution], then the request interface server 130 can select "ABC bank" for the account institution variable [$institution]. To generate the suggested request, the request interface server 130 plugs these selected values in to replace the variables in the selected one of the valid requests. In this example, the suggested request may read "I want to check the balance of my savings account at ABC bank."

Values for the variables may be selected by the request interface server 130, by the account management server(s) 140, or some combination thereof. Values for the variables may be selected based on which of the values are most commonly used in requests by the user overall, which of the values are most commonly used in this type of request by the user, which of the values was most recently used overall, which of the values was most recently used overall in this type of request by the user, or some combination thereof. Some variables and values may be linked, meaning that selection of a particular value in one variable may limit valid choices for another variable. For instance, if "gift card" is selected for the account type variable [$acct-type] in the scenario discussed above, then "ABC bank" would no longer be a valid value for the account institution variable [$institution], and "XYZ store" would still be a valid value for the account institution variable [$institution].

The valid request data structures 135 and account management data structures 145 may be any type of data structures, such as databases, tables, spreadsheets, key-value stores, dictionaries, relational models, arrays, lists, arraylists, trees, or some combination thereof. In some cases, the valid request data structures 135 may be referred to as valid request databases, or with the phrase "valid request" followed by any of the other types of data structures listed above. Similarly, the account management data structures 145 may be referred to as account management databases, or with the phrase "account management" followed by any of the other types of data structures listed above.

Figure 2:
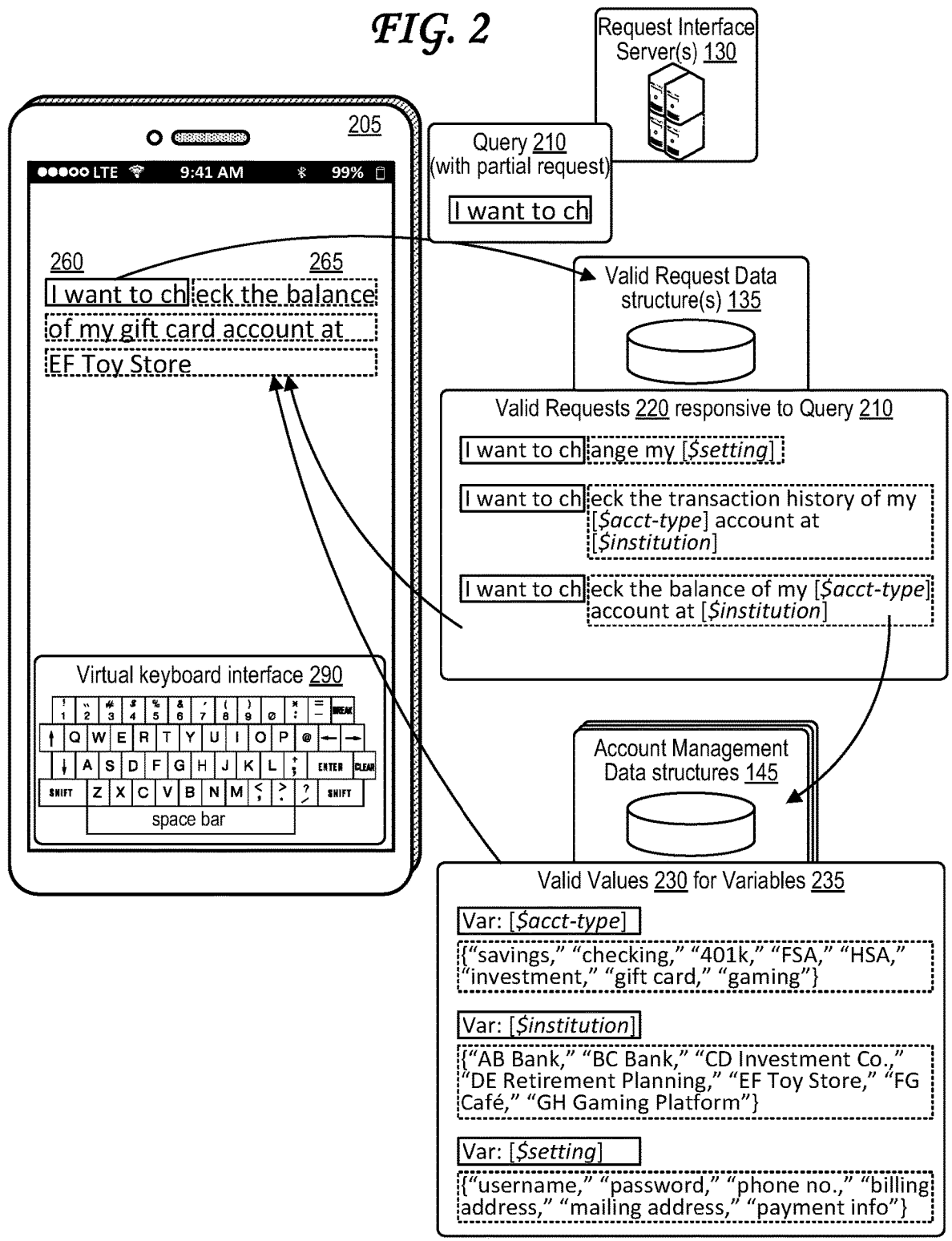
FIG. 2 is a conceptual diagram illustrating a conversational user interface providing a suggested request concerning checking a balance of a user account in response to a partial request, in accordance with some examples.

FIG. 2 is a conceptual diagram illustrating a conversational user interface providing a suggested request concerning checking a balance of a user account in response to a partial request. The conversational user interface is illustrated as being displayed on a touchscreen of a user device 205. The user device 205 may be any type of user device 120. The conversational user interface includes a virtual keyboard interface 290 displayed on the touchscreen of the user device 205 and that receives inputs through the touch-sensitive surface of the touchscreen of the user device 205. The virtual keyboard interface 290 is an input interface through which the user device 205 receives, in real time, a partial request 260 reading "I want to ch," illustrated in the interface with a solid black line around the text. The user device 205 sends the partial request 260 to the request interface server 130 in real time as the partial request 260 is received. This partial request 260 includes multiple characters forming a string of text that includes the words "I," "want," "to," and a partial word "ch."

The request interface server 130 receives the partial request 260 from the user device 205 and generates a query 210 with the partial request 260. The request interface server 130 uses the query 210 to query the valid request data structure 135. The valid request data structure 135 returns a list of valid requests 220 that are responsive to the query 210, in real time. The list of valid requests 220 that are responsive to the query 210 includes valid requests "I want to change my [$setting]," "I want to check the transaction history of my [$acct-type] account at [$institution]," and "I want to check the balance of my [$acct-type] account at [$institution]." The latter of these valid requests 220—"I want to check the balance of my [$acct-type] account at [$institution]"—is selected by the request interface server 130, for instance because this is the most common request overall and/or by the user of the valid requests 220, and/or because this user submitted the same type of request most recently of the valid requests 220. In some examples, instead of or in addition to In some examples, instead of or in addition to using a query 210 of the valid request data structure 135 for the valid requests 220, the request interface server 130 can obtain predictions of the valid requests 220 by inputting the partial request 260 into one or more trained machine learning models 1025 of a machine learning engine 1020 as illustrated in and/or discussed with respect to at least FIGS. 10 and 12.

Because the selected one of the valid requests 220 includes variables 235 [$acct-type] and [$institution], the request interface server 130 queries the account management data structures 145 for valid values 230 for these variables 235, in some cases through the account management servers 140. The account management data structures 145 identify and indicate to the request interface server 130, for instance through the account management servers 140, that valid values for the variable [$acct-type] include the values in the set: {"savings," "checking," "401 k," "FSA," "HSA," "investment," "gift card," "gaming"}. The account management data structures 145 identify and indicate to the request interface server 130, for instance through the account management servers 140, that valid values for the variable [$institution] include the values in the set: {"AB Bank," "BC Bank," "CD Investment Co.," "DE Retirement Co.," "EF Toy Store," "FG Café," "GH Gaming Platform," "MN Concerts"}. If a different one of the valid requests 220 was selected by the request interface server 130, the account management data structures 145 may identify and indicate to the request interface server 130, for instance through the account management servers 140, that valid values for the variable [$setting] include the values in the set: {"username," "password," "phone number," "billing address," "mailing address," "payment info" }. Values for the variables 235 [$acct-type] and [$institution] are selected by the request interface server 130 and/or by the account management servers 140. In particular, the value "gift card" is selected for the variable [$acct-type], and the value "EF Toy Store" is selected for the variable [$institution]. In some examples, instead of or in addition to querying the account management data structure 145 for the valid values 230, the request interface server 130 can obtain at least some of the valid values 230 from one or more data sources stored at the user device 205 or at a remote server accessible to (and/or accessed by) the user device 205 (e.g., associated with a software application running on the user device 205) and/or the request interface server 130. For example, the request interface server 130 can obtain at least some of the valid values 230 from a calendar, a to-do list, a schedule, a docket, a timetable, a timeline, a set of tickets, an agenda, an itinerary, an email client, a weather forecast, or another application, whether the data from the application is stored locally on the user device 205 or is remotely accessible at a remote served accessible to (and/or accessed by) the user device 205 and/or the request interface server 130. In some examples, instead of or in addition to querying the account management data structure 145 for the valid values 230, the request interface server 130 can obtain predictions of the valid values 230 by inputting the valid requests 220 (or predictions thereof based on the partial request 260) into one or more trained machine learning models 1025 of a machine learning engine 1020 as illustrated in and/or discussed with respect to at least FIGS. 11 and 12.

The suggested request 265 is generated by the request interface server 130 and/or by the account management servers 140 by plugging the selected values into the spots occupied by the variables 235 in the selected one of the valid requests 220. The suggested request 265 reads "I want to check the balance of my gift card account at EF Toy Store."

The suggested request 265 is sent to the user device 205 by the request interface server 130 and/or by the account management servers 140, and is displayed on the display screen of the user device 205 in the interface with a dotted black line around the text in the suggested request 265 that follows the partial request 260.

In some cases, the user tapping on the suggested request 265 on the touchscreen of the user device 205 may be treated as confirmation that the suggested request matches the user's intended request. An indication of this confirmation may be sent by the user device 205 to the request interface server 130. In response to receipt of the confirmation at the request interface server 130, the request interface server 130 performs an action corresponding to the suggested request 265. In the example of FIG. 2, performing the action includes checking the balance of the user's gift card at EF Toy Store. The request interface server 130 may request the balance of the user's gift card at EF Toy Store from one or more account management server(s) 140 and/or one or more account management data structure(s) 145, and may then send the balance to the user device 205. The user device 205 outputs the balance to the user, for example by displaying the balance on a display screen or by playing audio that vocally identifies the balance (e.g., if the balance is passed through the voice interface gateway 125). In some cases, the user device 205 outputs the balance to the user by automatically opening up a web page in a browser application of the user device 205, where the web page includes the balance or where the balance is accessible through the web page. In some cases, the user device 205 outputs the balance to the user by transitioning to the interface to an anchor page that includes the balance and/or additional information about the user, the gift card account at EF Toy Store, other accounts the user has at the same institution, other accounts that the user has overall, or some combination thereof.

Figure 3:
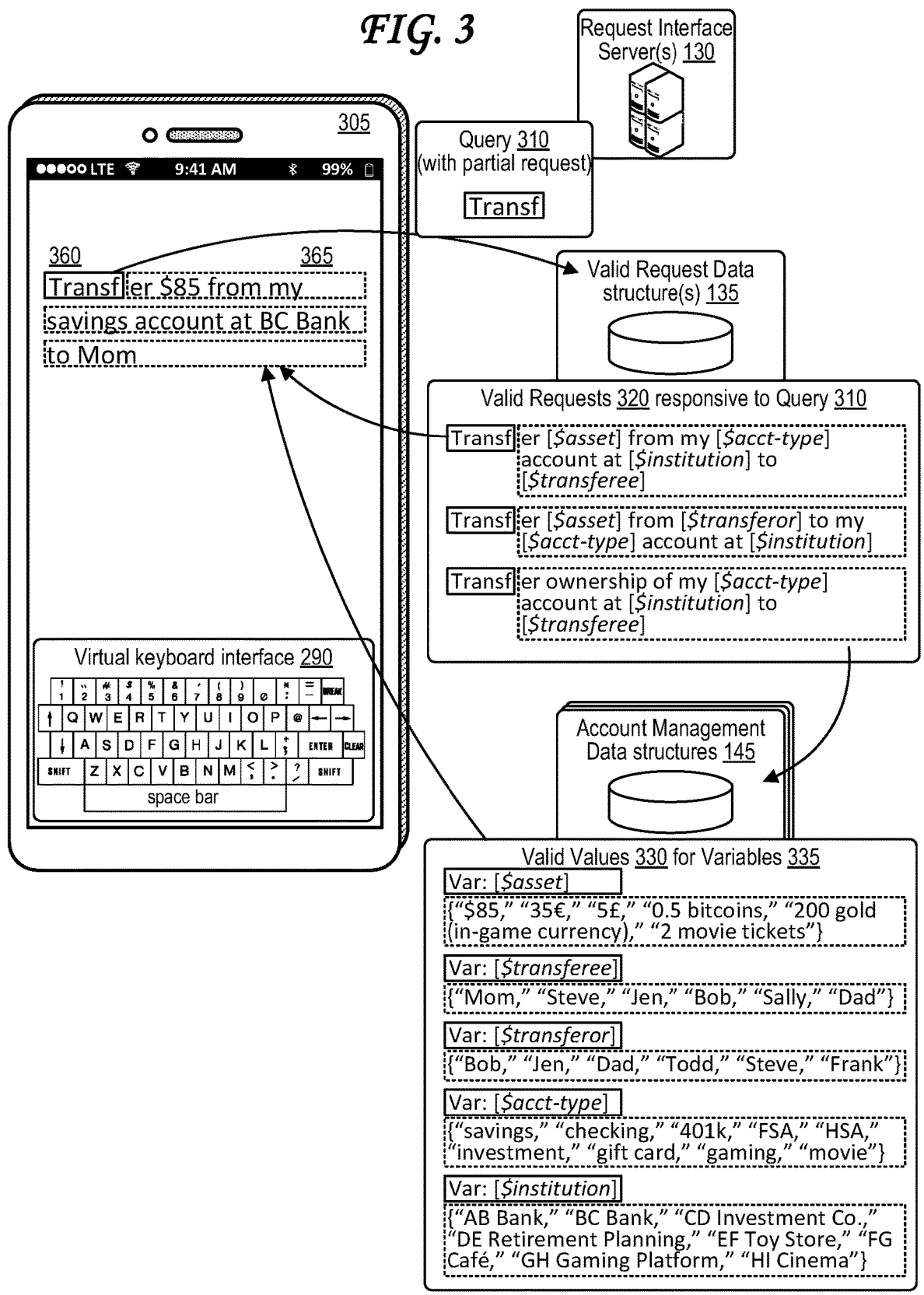
FIG. 3 is a conceptual diagram illustrating a conversational user interface providing a suggested request concerning transferring funds from a user account in response to a partial request, in accordance with some examples.

FIG. 3 is a conceptual diagram illustrating a conversational user interface providing a suggested request concerning transferring funds from a user account in response to a partial request. The conversational user interface is illustrated as being displayed on a touchscreen of a user device 305. The user device 305 may be any type of user device 120. The conversational user interface of FIG. 3 includes the virtual keyboard interface 290, through which the user device 305 receives a partial request 260 reading "Transf," illustrated in the interface with a solid black line around the text. The user device 305 sends the partial request 360 to the request interface server 130.

The request interface server 130 receives the partial request 360 from the user device 305 and generates a query 310 with the partial request 360. The request interface server 130 uses the query 310 to query the valid request data structure 135. The valid request data structure 135 returns a list of valid requests 320 that are responsive to the query 310. The list of valid requests 320 that are responsive to the query 310 includes valid requests "Transfer [$asset] from my [$acct-type] account at [$institution] to [$transferee]," "Transfer [$asset] from [$transferor] to my [$acct-type] account at [$institution]," and "Transfer ownership of my [$acct-type] account at [$institution] to [$transferee]." The first of these valid requests 320—"Transfer [$asset] from my [$acct-type] account at [$institution] to [$transferee]"—is selected by the request interface server 130, for instance because this is the most common request overall and/or by the user of the valid requests 320, and/or because this user submitted the same type of request most recently of the valid requests 320. In some examples, instead of or in addition to using a query 310 of the valid request data structure 135 for the valid requests 320, the request interface server 130 can obtain predictions of the valid requests 320 by inputting the partial request 360 into one or more trained machine learning models 1025 of a machine learning engine 1020 as illustrated in and/or discussed with respect to at least FIGS. 10 and 12.

Because the selected one of the valid requests 320 includes variables 335 [$asset], [$acct-type], [$institution], and [$transferee], the request interface server 130 queries the account management data structures 145 for valid values 330 for these variables 335, in some cases through the account management servers 140. The account management data structures 145 identify and indicate to the request interface server 130, for instance through the account management servers 140, that valid values for the variable [$asset] include the values in the set: {"$75," "35€," "5£," "0.5 bitcoins," "200 gold (in-game currency)," "2 movie tickets"}. The account management data structures 145 identify and indicate to the request interface server 130, for instance through the account management servers 140, that valid values for the variable [$acct-type] include the values in the set: {"savings," "checking," "401 k," "FSA," "HSA," "investment," "gift card," "gaming," "movie"}. The account management data structures 145 identify and indicate to the request interface server 130, for instance through the account management servers 140, that valid values for the variable [$institution] include the values in the set: {"AB Bank," "BC Bank," "CD Investment Co.," "DE Retirement Co.," "EF Toy Store," "FG Café," "GH Gaming Platform," "HI Cinema," "MN Concerts"}. The account management data structures 145 identify and indicate to the request interface server 130, for instance through the account management servers 140, that valid values for the variable [$transferee] include the values in the set: {"Mom," "Steve," "Jen," "Bob," "Sally," "Dad"}. Valid values 330 are also illustrated for variables 335 in the other valid requests 320. For instance, valid values for the variable [$transferor] are indicated to include values in the set: {"Bob," "Jen," "Dad," "Todd," "Steve," "Frank"}. Values for the variables 335 [$asset], [$acct-type], [$institution], and [$transferee], are selected by the request interface server 130 and/or by the account management servers 140. In particular, the value "$75" is selected for the variable [$asset], the value "savings" is selected for the variable [$acct-type], the value "BC Bank" is selected for the variable [$institution], and the value "Mom" is selected for the variable [$transferee]. In some examples, instead of or in addition to querying the account management data structure 145 for the valid values 330, the request interface server 130 can obtain at least some of the valid values 330 from one or more data sources stored at the user device 305 or at a remote server accessible to (and/or accessed by) the user device 305 (e.g., associated with a software application running on the user device 305) and/or the request interface server 130. For example, the request interface server 130 can obtain at least some of the valid values 330 from a calendar, a to-do list, a schedule, a docket, a timetable, a timeline, a set of tickets, an agenda, an itinerary, an email client, a weather forecast, or another application, whether the data from the application is stored locally on the user device 305 or is remotely accessible at a remote served accessible to (and/or accessed by) the user device 305 and/or the request interface server 130. In some examples, instead of or in addition to querying the account management data structure 145 for the valid values 330, the request interface server 130 can obtain predictions of the valid values 330 by inputting the valid requests 320 (or predictions thereof based on the partial request 360) into one or more trained machine learning models 1025 of a machine learning engine 1020 as illustrated in and/or discussed with respect to at least FIGS. 11 and 12.

Note that while the valid values 330 listed are not necessarily the only values that are valid. For instance, any numeric value from zero to a maximum (e.g., the user's balance) could be valid for the variable [$asset] (in some cases paired with an indication of which currency or unit the quantity expresses), not just the values in the set. However, the valid values 330 for the variable [$asset] may be selected to have some significance. For example, the value values for the variable [$asset] may be selected because this specific user commonly transfers the identified quantity of that particular asset, users in general user commonly transfer that quantity of that asset, this specific user commonly recently transferred that quantity of that asset, users in general user commonly transfer that quantity of that asset, or some combination thereof. As noted above, some variables may be linked to other variables, so that selection of one variable limits the valid values for the other variable. This may apply to the [$asset] variable as well. For instance, if the [$transferee] variable is selected to be "Mom" before the [$asset] variable is selected, then the valid values for the [$asset] variable may be limited to those commonly used by the user in previous transfers to transferee Mom, those recently used by the user in previous transfers to transferee Mom, those commonly used in previous transfers from Mom as a transferor, those recently used in previous transfers from Mom as a transferor, or some combination thereof.

The suggested request 365 is generated by the request interface server 130 and/or by the account management servers 140 by plugging the selected values into the spots occupied by the variables 335 in the selected one of the valid requests 320. The suggested request 365 reads "Transfer $75 from my savings account at BC Bank to Mom." The suggested request 365 is sent to the user device 305 by the request interface server 130 and/or by the account management servers 140, and is displayed on the display screen of the user device 305 in the interface with a dotted black line around the text in the suggested request 365 that follows the partial request 360.

Once the user confirms that the suggested request matches the user's intended request, the confirmation may be sent by the user device 305 to the request interface server 130. In response, the request interface server 130 performs an action corresponding to the suggested request 365. In the example of FIG. 3, performing the action includes transferring $75 from my savings account at BC Bank to an account corresponding to a transferee Mom. The request interface server 130 can perform the transfer, for instance by acting as an intermediary between an account management server 140 associated with the user's savings account at BC Bank and account management server 140 associated with the transferee Mom's account. Once the transfer is complete, the request interface server 130 sends a confirmation notification confirming that the transfer is complete to the user device 305, which displays and/or audibly outputs the confirmation notification.

In some cases, the suggested request 365 may further include information about an account type and account institution of the account of the transferee Mom. For instance, the selected request of the valid requests 320 could read "Transfer [$asset] from my [$acct-type] account at [$institution] to [$transferee]'s [$transferee-acct-type] account at [$transferee-institution]." The request interface server 130 can query the account management data structures 145, for instance through the account management servers 140, for valid values for the variables [$transferee-acct-type] and [$transferee-institution]. The request interface server 130 can receive and select values from those valid values, and plug them into the selected request to generate the suggested request. For instance, if the valid value selected for [$transferee-acct-type] is "checking" the valid value selected for [$transferee-institution] is "AB Bank," then the resulting suggested request would read "Transfer $75 from my savings account at BC Bank to Mom's checking account at AB Bank." In performing the transfer, the request interface server 130 can ensure that the $75 is transferred specifically to transferee Mom's checking account at AB Bank.

In some cases, a partial request may be checked for spelling errors and/or grammatical errors by the request interface server 130. Any spelling errors and/or grammatical errors may be automatically corrected by the request interface server 130 before the partial request is used to generate a query to the valid request data structure 135. For instance, if a partial request reads "I want too transsfer," the request interface server 130 may alter the partial request to read "I want to transfer" before querying the valid request data structure 135 with the corrected partial request.

Figure 4:
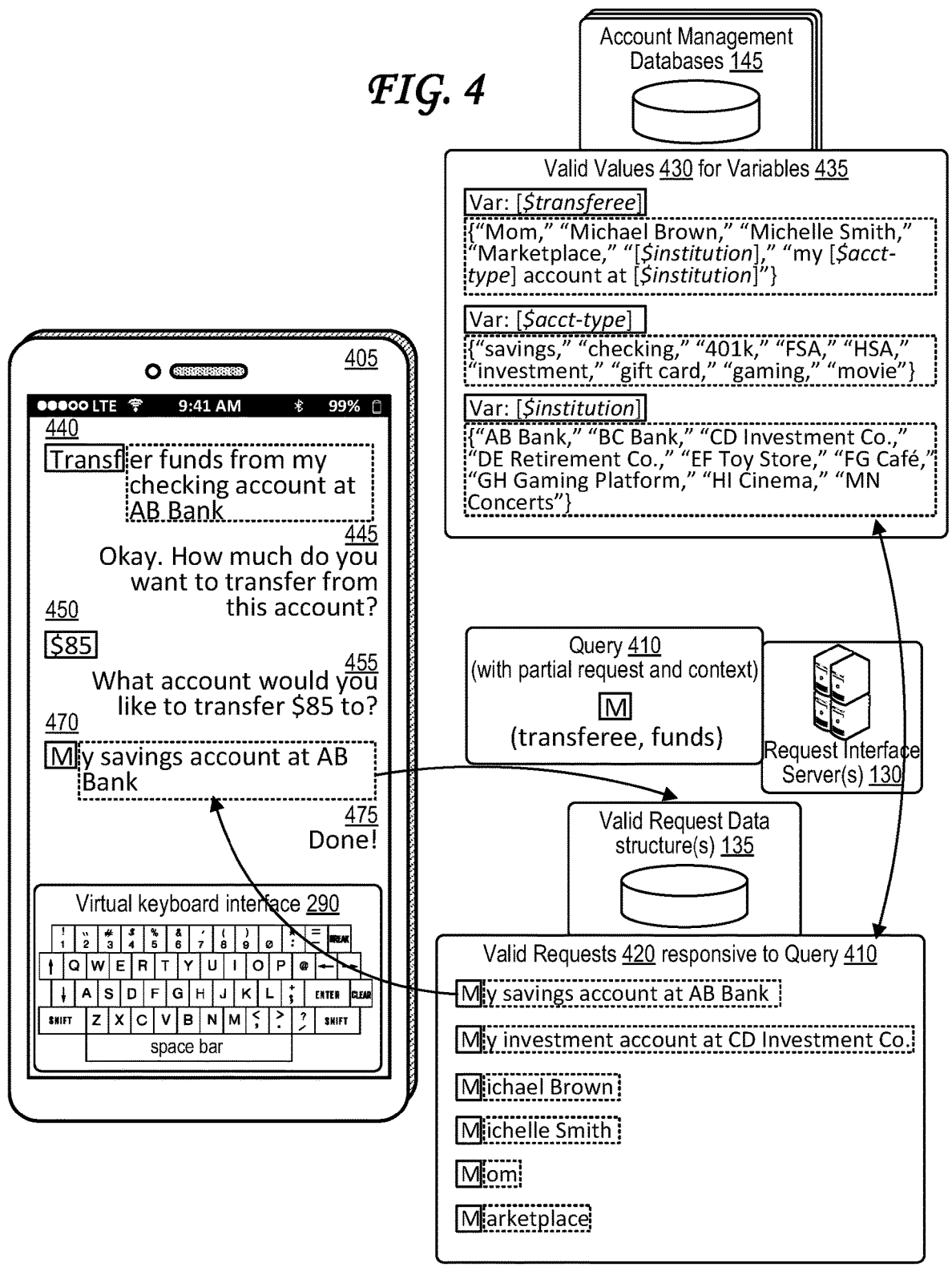
FIG. 4 is a conceptual diagram illustrating a conversational user interface that requests additional information used to perform a transfer of funds from a user account, in accordance with some examples.

FIG. 4 is a conceptual diagram illustrating a conversational user interface that requests additional information used to perform a transfer of funds from a user account. The conversational user interface is illustrated as being displayed on a touchscreen of a user device 405. The user device 405 may be any type of user device 120. The conversational user interface of FIG. 4 includes the virtual keyboard interface 290.

The conversational user interface includes a conversation between the user of the user device 405 and an automated assistant. The conversation includes messages 440, 450, and 460 input into an input interface of the user device 405 by the user (e.g., through the virtual keyboard interface 290). The conversation includes messages 445, 455, and 465 generated by the request interface server 130 and sent to the user device 405. In the conversation, the first message 440 is at least partially input into the user device 405 by the user, and reads "Transfer funds from my checking account at AB Bank." The characters "Transf" in the first message 440 are illustrated in the interface with a solid black line around the text, indicating that this was a partial request input into the user device 405 by the user. The characters "er funds from my checking account at AB Bank" in the first message 440 are illustrated in the interface with a dotted black line around the text, indicating that "Transfer funds from my checking account at AB Bank" was a suggested request generated by the request interface server 130 responsive to the partial request "Transf" and confirmed by the user.

A second message 445 responsive to the first message 440 is generated by the request interface server 130 and reads "Okay. How much do you want to transfer from this account?" The second message 445 thus requests additional information from the user device 405. The third message 450 responsive to the second message 445 is input into the user device 405 by the user and reads "$75." The third message 450 ("$75") is illustrated in the interface with a solid black line around the text, indicating that the user wrote the third message 450. A fourth message 455 responsive to the third message 450 is generated by the request interface server 130 and reads "What account would you like to transfer $75 to?"

A fifth message 460 responsive to the fourth message 455 is partially input into the user device 405 by the user and completed via a suggested message from the request interface server 130, and reads "My savings account." The partial message in the fifth message 460, illustrated in the interface with a solid black line around the corresponding text, includes only the letter "M." The request interface server 130 generates a query 410, which includes the partial message ("M") as well as context from the conversation, specifically that the fifth message 460 concerns a transferee account and a transfer of funds, since the fifth message 460 is responsive to the fourth message 455. The request interface server 130 can generate and use the query 410 to query the valid request data structure 135 for valid requests 420. In some examples, instead of or in addition to using a query 410 of the valid request data structure 135 for the valid requests 420, the request interface server 130 can obtain predictions of the valid requests 420 by inputting the partial request into one or more trained machine learning models 1025 of a machine learning engine 1020 as illustrated in and/or discussed with respect to at least FIGS. 10 and 12. The request interface server 130 queries the account management data structures 145 for valid values 430 for variables 435 relevant to transferee accounts, such as [$transferee].

The account management data structures 145 identify and indicate to the request interface server 130, for instance through the account management servers 140, that valid values for the variable [$transferee] include the values in the set: {"Mom," "Michael Brown," "Michelle Smith," "Marketplace," "[$institution]," "my [$acct-type] account at [$institution]"}. Note that one of the valid values for the variable [$transferee] includes variables itself; namely, "my [$acct-type] account at [$institution]" includes variables [$acct-type] and [$institution]. The account management data structures 145 identify and indicate to the request interface server 130, for instance through the account management servers 140, that valid values for the variable [$acct-type] include the values in the set: {"savings," "checking," "401k," "FSA," "HSA," "investment," "gift card," "gaming," "movie"}. The account management data structures 145 identify and indicate to the request interface server 130, for instance through the account management servers 140, that valid values for the variable [$institution] include the values in the set: {"AB Bank," "BC Bank," "CD Investment Co.," "DE Retirement Co.," "EF Toy Store," "FG Café," "GH Gaming Platform," "HI Cinema," "MN Concerts"}. In some examples, instead of or in addition to querying the account management data structure 145 for the valid values 430, the request interface server 130 can obtain at least some of the valid values 430 from one or more data sources stored at the user device 405 or at a remote server accessible to (and/or accessed by) the user device 405 (e.g., associated with a software application running on the user device 405) and/or the request interface server 130. For example, the request interface server 130 can obtain at least some of the valid values 430 from a calendar, a to-do list, a schedule, a docket, a timetable, a timeline, a set of tickets, an agenda, an itinerary, an email client, a weather forecast, or another application, whether the data from the application is stored locally on the user device 405 or is remotely accessible at a remote served accessible to (and/or accessed by) the user device 405 and/or the request interface server 130. In some examples, instead of or in addition to querying the account management data structure 145 for the valid values 430, the request interface server 130 can obtain predictions of the valid values 430 by inputting the valid requests 420 (or predictions thereof based on the partial request) into one or more trained machine learning models 1025 of a machine learning engine 1020 as illustrated in and/or discussed with respect to at least FIGS. 11 and 12.

Ultimately, the request interface server 130 and/or account management server 140 generate the suggested message "My savings account at AB Bank" by selecting the valid value "my [$acct-type] account at [$institution]" for the variable [$transferee], selecting valid value "savings" for the variable [$acct-type], and selecting the valid value "AB Bank" for the variable [$institution]. Other valid requests 420 responsive to the query 410 may also be generated. In FIG. 4, other valid requests 420 include "My investment account at CD Investment Co.," "Michael Brown," "Michelle Smith," "Mom," and "Marketplace."

The first message 440, third message 450, and fifth message 460 may be treated as three portions of a single request. The single request, rephrased, would be "Transfer $75 of funds from my checking account at AB Bank to my savings account at AB Bank." However, the conversational style may be easier for users to use. The request interface server 130 and/or account management server 140 then perform the action corresponding to this request, namely transferring $75 of funds from the user's checking account at AB Bank to the user's savings account at AB Bank. Once this action is complete, a sixth message 465 responsive to the fifth message 460 is generated by the request interface server 130 and output to the user device 405, reading "Done!"

Figure 5:
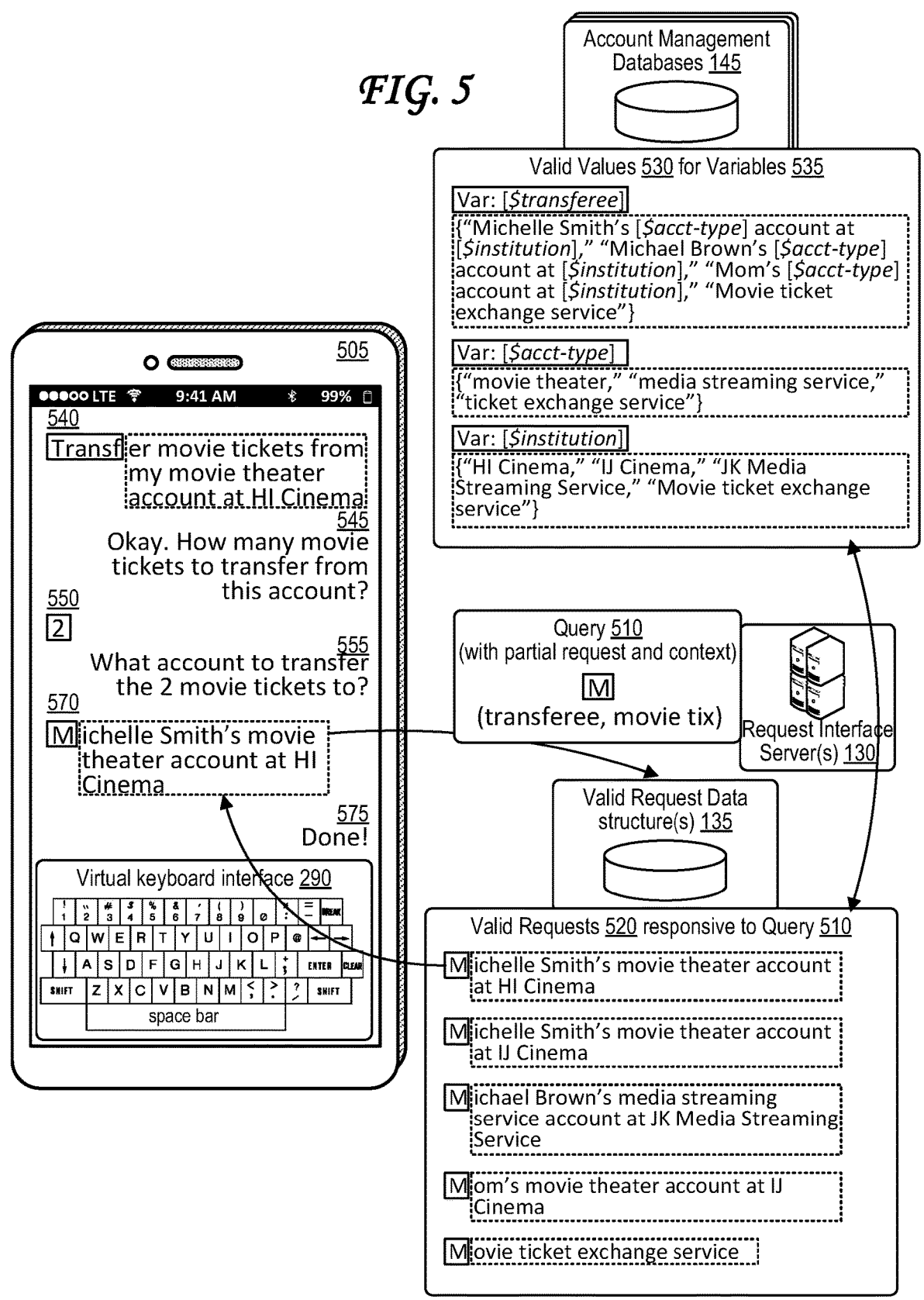
FIG. 5 is a conceptual diagram illustrating a conversational user interface that requests additional information used to perform a transfer of movie tickets from a user account, in accordance with some examples.

FIG. 5 is a conceptual diagram illustrating a conversational user interface that requests additional information used to perform a transfer of movie tickets from a user account. The conversational user interface is illustrated as being displayed on a touchscreen of a user device 505. The user device 505 may be any type of user device 120. The conversational user interface of FIG. 5 includes the virtual keyboard interface 290.

The conversational user interface includes a conversation between the user of the user device 505 and an automated assistant. The conversation includes messages 540, 550, and 560 input into an input interface of the user device 505 by the user (e.g., through the virtual keyboard interface 290). The conversation includes messages 545, 555, and 565 generated by the request interface server 130 and sent to the user device 505. In the conversation, the first message 540 is at least partially input into the user device 505 by the user, and reads "Transfer movie tickets from my movie theater account at HI Cinema." The characters "Transf" in the first message 540 are illustrated in the interface with a solid black line around the text, indicating that this was a partial request input into the user device 505 by the user. The characters "er movie tickets from my movie theater account at HI Cinema" in the first message 540 are illustrated in the interface with a dotted black line around the text, indicating that "Transfer movie tickets from my movie theater account at HI Cinema" was a suggested request generated by the request interface server 130 responsive to the partial request "Transf" and confirmed by the user.

A second message 545 responsive to the first message 540 is generated by the request interface server 130 and reads "Okay. How many movie tickets to transfer from this account?" The second message 545 thus requests additional information from the user device 505. The third message 550 responsive to the second message 545 is input into the user device 505 by the user and reads "2," indicating that 2 movie tickets should be transferred. The third message 550 ("2") is illustrated in the interface with a solid black line around the text, indicating that the user wrote the third message 550. A fourth message 555 responsive to the third message 550 is generated by the request interface server 130 and reads "What account to transfer the 2 movie tickets to?"

A fifth message 560 responsive to the fourth message 555 is partially input into the user device 505 by the user and completed via a suggested message from the request interface server 130, and reads "Michelle Smith's movie theater account at HI Cinema." The partial message in the fifth message 560, illustrated in the interface with a solid black line around the corresponding text, includes only the letter "M." The request interface server 130 generates a query 510, which includes the partial message ("M") as well as context from the conversation, specifically that the fifth message 560 concerns a transferee account and a transfer of movie tickets, since the fifth message 560 is responsive to the fourth message 555. The request interface server 130 can generate and use the query 510 to query the valid request data structure 135 for valid requests 520. In some examples, instead of or in addition to using a query 510 of the valid request data structure 135 for the valid requests 520, the request interface server 130 can obtain predictions of the valid requests 520 by inputting the partial request into one or more trained machine learning models 1025 of a machine learning engine 1020 as illustrated in and/or discussed with respect to at least FIGS. 10 and 12. The request interface server 130 queries the account management data structures 145 for valid values 530 for variables 535 relevant to transferee accounts, such as [$transferee].

The account management data structures 145 identify and indicate to the request interface server 130, for instance through the account management servers 140, that valid values for the variable [$transferee] include the values in the set: {"Michelle Smith's [$acct-type] account at [$institution]," "Michael Brown's [$acct-type] account at [$institution]," "Mom's [$acct-type] account at [$institution]," "Movie ticket exchange"}. The values for the variable [$transferee] include in FIG. 5 are different from those in FIG. 4 in that they provide additional details about specific accounts at specific institutions for other users. The values for the variable [$transferee] include in FIG. 5 are different from those in FIG. 4 also in that "Marketplace" is removed as a valid value for the variable [$transferee] by the request interface server 130 and/or account management servers 140 because "Marketplace" is not valid in the context of transferring movie tickets, and also in that "Movie ticket exchange service" is added as a valid value for the variable [$transferee] by the request interface server 130 and/or account management servers 140 because "Movie ticket exchange service" is valid in the context of transferring movie tickets. In some examples, instead of or in addition to querying the account management data structure 145 for the valid values 530, the request interface server 130 can obtain at least some of the valid values 530 from one or more data sources stored at the user device 505 or at a remote server accessible to (and/or accessed by) the user device 505 (e.g., associated with a software application running on the user device 505) and/or the request interface server 130. For example, the request interface server 130 can obtain at least some of the valid values 530 from a calendar, a to-do list, a schedule, a docket, a timetable, a timeline, a set of tickets, an agenda, an itinerary, an email client, a weather forecast, or another application, whether the data from the application is stored locally on the user device 505 or is remotely accessible at a remote served accessible to (and/or accessed by) the user device 505 and/or the request interface server 130. In some examples, instead of or in addition to querying the account management data structure 145 for the valid values 530, the request interface server 130 can obtain predictions of the valid values 530 by inputting the valid requests 520 (or predictions thereof based on the partial request) into one or more trained machine learning models 1025 of a machine learning engine 1020 as illustrated in and/or discussed with respect to at least FIGS. 11 and 12.

Note that many of the valid values for the variable [$transferee] themselves include variables. Specifically, a number of the values for the variable [$transferee] include the variables [$acct-type] and [$institution]. The valid values for the variables [$acct-type] and [$institution] are different in FIG. 5 than they are in FIG. 4 because the context is different—transfer of funds in FIG. 4 versus transfer of movie tickets in FIG. 5. The account management data structures 145 identify and indicate to the request interface server 130, for instance through the account management servers 140, that valid values for the variable [$acct-type] given the context include the values in the set: {"movie theater," "media streaming service," "ticket exchange service"}. The account management data structures 145 identify and indicate to the request interface server 130, for instance through the account management servers 140, that valid values for the variable [$institution] given the context include the values in the set: {"HI Cinema," "IJ Cinema," "JK Media Streaming Service," "Movie ticket exchange service"}.

Different account management data structures 145 may be associated with different accounts, account types, institutions, and so forth. For example, JK Media Streaming Service may have its own account management database, and Movie ticket exchange service may have its own account management database. HI Cinema and IJ Cinema may each have their own account management databases (e.g., if they are competing cinemas) or may share an account management database (e.g., if they are different branch locations for a single cinema company or different companies that share a third party account management service provider). Similarly, institutions listed in FIG. 4 may each have their own account management database(s)—such as AB Bank, BC Bank, CD Investment Co., DE Retirement Co., EF Toy Store, FG Café, GH Gaming Platform, and MN Concerts. Each account management data structure 145 may be associated with a corresponding account management server 140. In some cases, multiple account management data structures 145 may be managed by a single account management server 140. In some cases, a single account management data structure 145 may be managed by multiple account management servers 140. Based on the context in FIG. 5—transfer of movie tickets—the request interface server 130 may limit which account management servers 140 and/or account management data structures 145 are queried to provide valid values 530 for the variables 535. For instance, the request interface server 130 may query only those account management servers 140 and/or account management data structures 145 that are associated with movies and/or movie tickets in some way, and/or that the request interface server 130 knows (e.g., based on previous transactions) can handle transfers of movie tickets between accounts.

Ultimately, the request interface server 130 and/or account management server 140 generate the suggested message "Michelle Smith's movie theater account at HI Cinema" by selecting the valid value "Michelle Smith's [$acct-type] account at [$institution]" for the variable [$transferee], selecting valid value "movie theater" for the variable [$acct-type], and selecting the valid value "HI Cinema" for the variable [$institution]. Other valid requests 520 responsive to the query 510 may also be generated. In FIG. 5, other valid requests 520 include "Michelle Smith's movie theater account at IJ Cinema," "Michael Brown's media streaming service account at JK Media Streaming Service," "Mom's movie theater account at IJ Cinema," and "Movie ticket exchange service."

The first message 540, third message 550, and fifth message 560 may be treated as three portions of a single request. The single request, rephrased, would be "Transfer 2 movie tickets from my movie theater account at HI Cinema to Michelle Smith's movie theater account at HI Cinema." However, the conversational style may be easier for users to use. The request interface server 130 and/or account management server 140 then perform the action corresponding to this request, namely transferring 2 movie tickets from the user's movie theater account at HI Cinema to user Michelle Smith's movie theater account at HI Cinema. Once this action is complete, a sixth message 565 responsive to the fifth message 560 is generated by the request interface server 130 and output to the user device 505, reading "Done!"

A variety of types of assets may be transferred between accounts as discussed herein. For example, movie tickets may be transferred as illustrated in FIG. 5, or quantities of a currency may be transferred as illustrated in FIG. 3 and FIG. 4. Other assets that may be transferred include concert tickets, airline tickets, train tickets, bus tickets, subway tickets, ferry tickets, transit tickets, amusement park tickets, ride tickets, cruise tickets, boat tickets, rental car passes, bus passes, subway passes, train passes, ferry passes, transit passes, amusement park passes, ride passes, cruise passes, boat passes, virtual queue passes, virtual queue spots, bridge tolls, fast lane tolls, road tolls, other tolls, virtual gift cards, additions to a gift card balance, coupons, discounts, offers, passes for a music streaming service, passes for a video streaming service, passes for a media streaming service, passes for an online video gaming service, passes for a video game streaming service, an image, a film, a television show, a music video, a video, a song, a video game, an electronic book (ebook), a document, a digital edition of a magazine, a digital edition of a scientific journal, a digital edition of a newspaper, a magazine subscription, a newspaper subscription, a scientific journal subscription, a digital media asset, a license to access scholarly journal content, a license to access digital media content, a license to play a song, a license to play a video, a license to play a video game, a license to display an image, a quantity of a currency, a quantity of airline miles, a quantity of frequent flyer miles, a quantity of points, a reward, a membership, or some combination thereof.

Accounts may be associated with users, customers, merchants, products, services, brands, distributors, or combinations thereof. In some cases, two or more transfers may occur at once, as in a purchase. For example, a requesting user may request to purchase a gift card for a particular store for a recipient (either the requesting user or a friend). Once the request interface server 130 receives this request, a quantity of funds may be transferred from a requesting user account associated with the requesting user to a merchant account associated with the store, or to a gift card service account associated with a gift card service that manages gift cards for the store, the transfer managed by one or more account management servers 140 and account management data structures 145. The merchant account associated with the store or the gift card service account associated with the gift card service then also transfer the virtual gift card to a recipient account of the recipient. If the recipient is the requesting user, then the recipient account may be the same account as the requesting user account, or may be a different account associated with the requesting user, such as an account that the requesting user specifically uses for gift card or for shopping at the store in question. If the recipient is not the requesting user, then the recipient account is different from the requesting user account.

Figure 6:
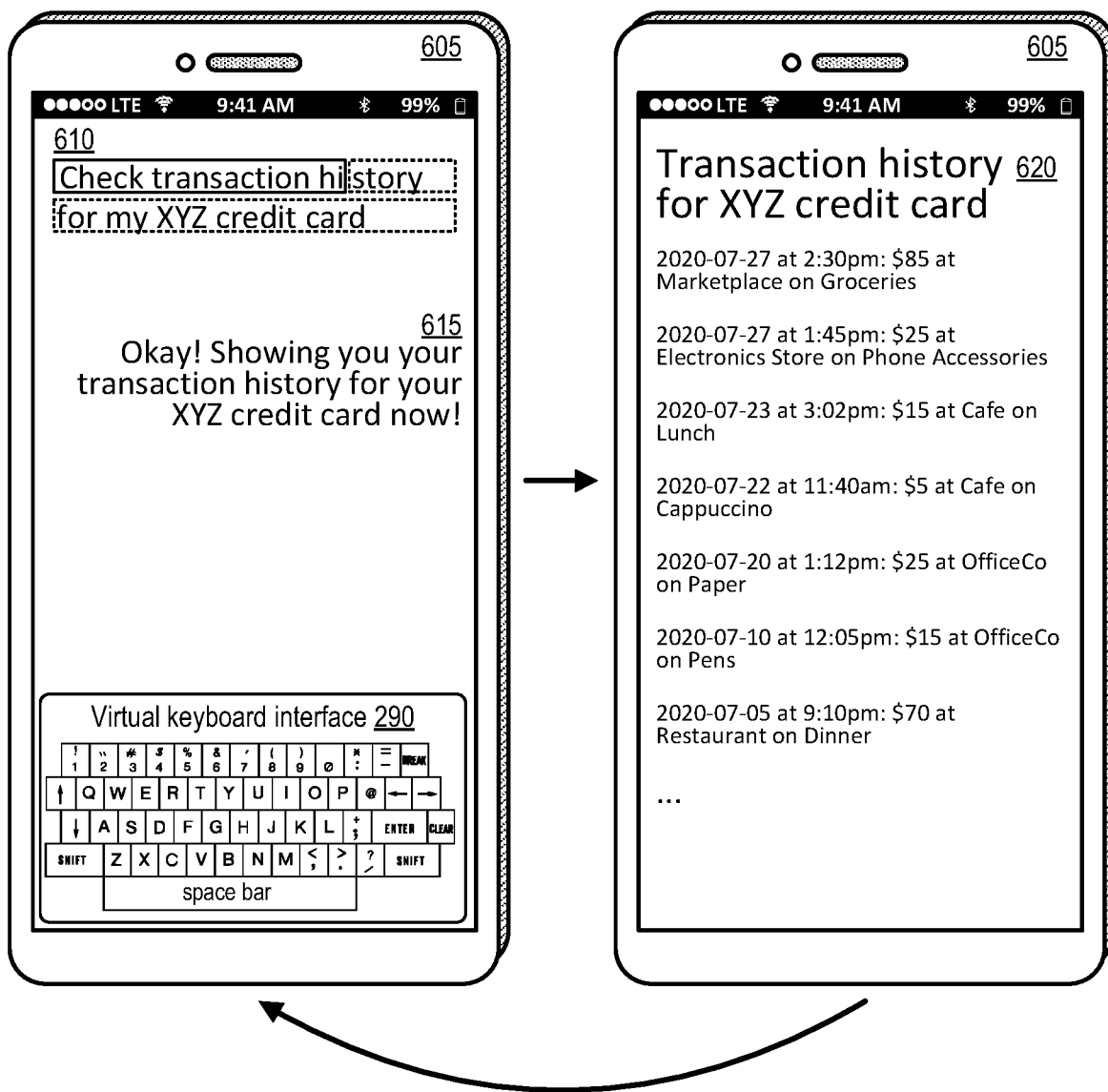
FIG. 6 is a conceptual diagram illustrating a conversational user interface that triggers activation of an anchor interface identifying a transaction history associated with a user account, in accordance with some examples.

FIG. 6 is a conceptual diagram illustrating a conversational user interface that triggers activation of an anchor interface identifying a transaction history associated with a user account. The conversational user interface is illustrated as being displayed on a touchscreen of a user device 605. The user device 605 may be any type of user device 120. The conversational user interface of FIG. 6 includes the virtual keyboard interface 290.

A conversation is illustrated in the conversational user interface of FIG. 6 with a first message 610 and a second message 615. The first message 610 reads "Check transaction history for my XYZ credit card." A first portion of the first message 610 reading "Check transaction hi" is illustrated with a solid black outline, indicating that this portion is a partial request input by the user into the user device 605. A second portion of the first message 615 reading "story for my XYZ credit card" is illustrated with a dotted black outline. The dotted black outline indicates that this portion of the first message 610 is part of a suggested request generated by the request interface server 130 and/or account management server 140 based on the partial request, provided to the user device 605, and confirmed at the user device 605 as matching the intent of the user.

The second message 615 generated by the request interface server 130 and is sent to and output at the user device 605. The second message 615 is responsive to the request in the first message 610. The second message 615 reads "Okay! Showing you your transaction history for your XYZ credit card now!" The user device 605 then transitions from the conversational user interface to an anchor page 620 corresponding to the transaction history of the user's XYZ credit card. The anchor page 620 includes a title, "Transaction history for XYZ credit card," as well as a number of transactions listed in reverse chronological order. The transactions include: 2020 Jun. 26 at 2:30 pm: $75 at Marketplace on Groceries; 2020 Jun. 23 at 1:45 pm: $25 at Electronics Store on Phone Accessories; 2020 Jun. 23 at 3:02 pm: $15 at Cafe on Lunch; 2020 Jun. 22 at 11:40 am: $5 at Cafe on Cappuccino; 2020 Jun. 20 at 1:12 pm: $25 at OfficeCo on Paper; 2020 Jun. 10 at 12:05 pm: $15 at OfficeCo on Pens; and 2020 Jun. 5 at 8:10 pm: $60 at Restaurant on Dinner. The anchor page 620 may be generated by the request interface server 130 and/or account management server 140 and sent to the user device 605. Alternately, the request interface server 130 and/or account management server 140 may generate a hyperlink or other pointer to the anchor page 620, which may direct the user device 605 to the anchor page 620. Once the user has finished viewing the anchor page 620, the user device 605 may return to the conversational interface.

Figure 7:
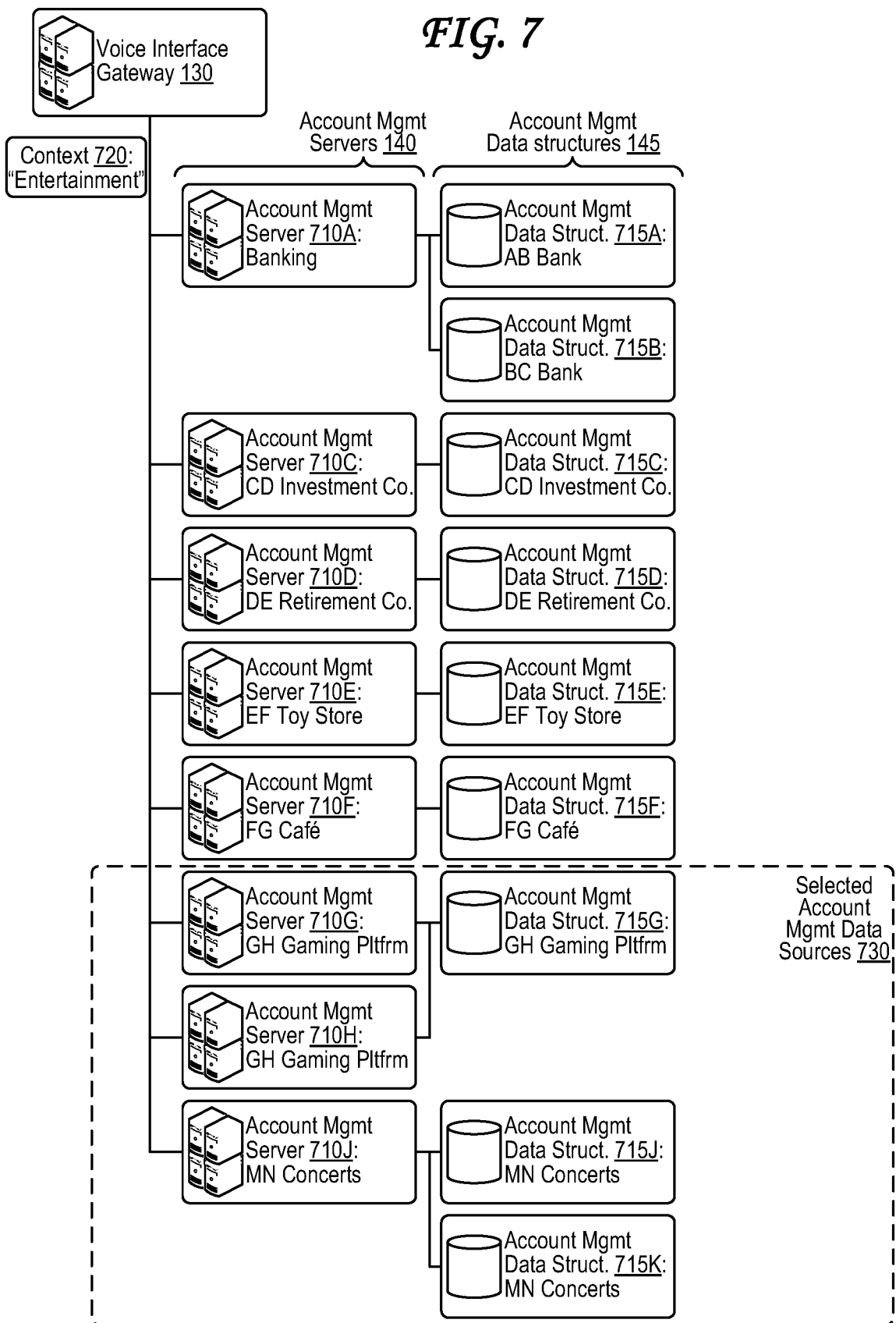
FIG. 7 is a conceptual diagram illustrating selection of account management data sources based on context, in accordance with some examples.

FIG. 7 is a conceptual diagram illustrating selection of account management data sources based on context. In the conceptual diagram of FIG. 7, the voice interface gateway 125 is illustrated as communicatively coupled to numerous account management servers 140 and numerous account management data structures 145. The various account management servers 140 account management data structures 145 illustrated in FIG. 7 are each associated with various institutions.

The account management servers 140 include a first account management server 710A associated with banking. The first account management server 710A is coupled to and manages queries to a first account management data structure 715A associated with institution AB Bank and a second account management data structure 715B associated with institution BC Bank. The first account management server 710A is an example of an account management server 710 that is coupled to and manages data queries for multiple account management data structures 715. The first account management server 710A associated with banking may, for example, be a server associated with a third party service that both AB Bank and BC Bank use. Alternately, AB Bank and BC Bank may be different branch locations associated with a single overarching banking institution, and the first account management server 710A may be associated with this single overarching banking institution.

An account management server 710 can also be coupled to and manage data queries for a single account management data structure 715. The conceptual diagram of FIG. 7 includes several examples of this. For instance, the account management servers 140 include a second account management server 710C associated with the institution CD Investment Company. The second account management server 710C is coupled to and manages queries to a third account management data structure 715C associated with the institution CD Investment Company. The account management servers 140 also include a third account management server 710D associated with the institution DE Retirement Company, which is coupled to and manages queries to a fourth account management data structure 715D associated with the institution DE Retirement Company. The account management servers 140 also include a fourth account management server 710E associated with the institution EF Toy Store, which is coupled to and manages queries to a fifth account management data structure 715E associated with the institution EF Toy Store. The account management servers 140 also include a fifth account management server 710F associated with the institution FG Café, which is coupled to and manages queries to a sixth account management data structure 715F associated with the institution FG Café.

Multiple account management servers 710 can also be coupled to and manage data queries for a single account management data structure 715. This may be useful, for instance, when a particular account management data structure 715 is expected to receive many queries. For example, the account management servers 140 include a sixth account management server 710G and a seventh account management server 710H, both of which are associated with the institution GH Gaming Platform. The sixth account management server 710G and the seventh account management server 710H are both coupled to, and manage queries to, a seventh account management data structure 715G associated with the institution GH Gaming Platform.

The account management servers 140 also include an eighth account management server 710J associated with the institution MN Concerts. The eighth account management server 710J is coupled to and manages queries to both an eighth account management data structure 715J associated with the institution MN Concerts and a second account management data structure 715K associated with the institution MN Concerts. A single institution may be associated multiple account management data structures 715 managed by one or more account management servers 710 when, for example, the institution hold large amounts of data, or wishes to provide redundancies of their data.

The voice interface gateway 125 determined context 720, for instance based on previously-input information from a conversational interface such as any of those illustrated in FIGS. 2-6. For instance, the context 720 may be an example of the context associated with the query 410 in FIG. 4, the context associated with the query 510 in FIG. 5, the context received by the request interface server 130 in operation 820 of FIG. 8, or some combination thereof. The context 720 of FIG. 7 indicates that a user's partial request concerns entertainment.

The conceptual diagram of FIG. 7 includes a group of selected account management data sources 730 that the request interface server 130 and/or the account management servers 140 determine to be relevant to the context 720 (entertainment). The selected account management data sources 730 are illustrated within a dashed box in FIG. 7, and include the account management data sources associated with the institutions GH Gaming Platform and MN Concerts. These include the sixth account management server 710G, the seventh account management server 710H, the eighth account management server 710J, the seventh account management data structure 715G, the eighth account management data structure 715J, and the ninth account management data structure 715K.

The selection of the selected account management data sources 730 may be performed by the request interface server 130. For instance, the request interface server 130 may store descriptors of the various account management servers 140 and/or account management data structures 145 that the request interface server 130 is coupled to, and may determine based on a comparison the context 720 to these descriptors whether or not to include particular account management servers 710 and/or account management data structures 715 within the selected account management data sources 730. These descriptors may include tags identifying categories of data managed and/or stored at each of the various account management servers 140 and/or account management data structures 145. These descriptors may include tags identifying categories of data that the request interface server 130 has previously received from each of the various account management servers 140 and/or account management data structures 145.

The selection of the selected account management data sources 730 may be performed by the account management servers 140 based on data received from the request interface server 130. For instance, the request interface server 130 may send the context 720 (or information describing the context) to each of the account management servers 140 and/or as queries to each of the account management data structures 145. Each of the account management servers 140 may determine, based on the context 720 received from the request interface server 130, whether the account management server and/or any coupled account management data structures includes data that is relevant to the context 720. Based on this determination the account management servers 140 and/or account management data structures 145 may include themselves, or allow themselves to be included, in the selected account management data sources 730 associated with the context 720 and/or with a particular partial or complete request.

In some cases, selection of the selected account management data sources 730 may utilize one or more artificial intelligence (AI) and/or machine learning (ML) models run by the request interface server 130, one or more of the account management servers 140, the user device 120, another computing device 1400, or some combination thereof. The one or more artificial intelligence (AI) and/or machine learning (ML) models may include classifiers, and may be used to determine whether or not a particular account management server 710 and/or account management data structure 715 includes data relevant to a particular context 720, query, partial request, valid request from the valid request data structure 135, suggested request, or some combination thereof. The one or more artificial intelligence (AI) and/or machine learning (ML) models may utilize and/or be trained using one or more artificial intelligence (AI) and/or machine learning (ML) algorithms. The one or more machine learning (ML) algorithms may include a neural network (NN), such as a convolutional neural network (CNN), a time delay neural network (TDNN), a deep feed forward neural network (DFFNN), a recurrent neural network (RNN), an auto encoder (AE), a variation AE (VAE), a denoising AE (DAE), a sparse AE (SAE), a Markov chain (MC), a perceptron, or some combination thereof. The one or more machine learning (ML) algorithms may include a supervised learning algorithm, a deep learning algorithm, or some combination thereof. The AI and/or ML models may include the ML engine 1020. The AI and/or ML models may include the one or more ML models 1025. The AI and/or ML models may include the neural network 1300.

Figure 8:
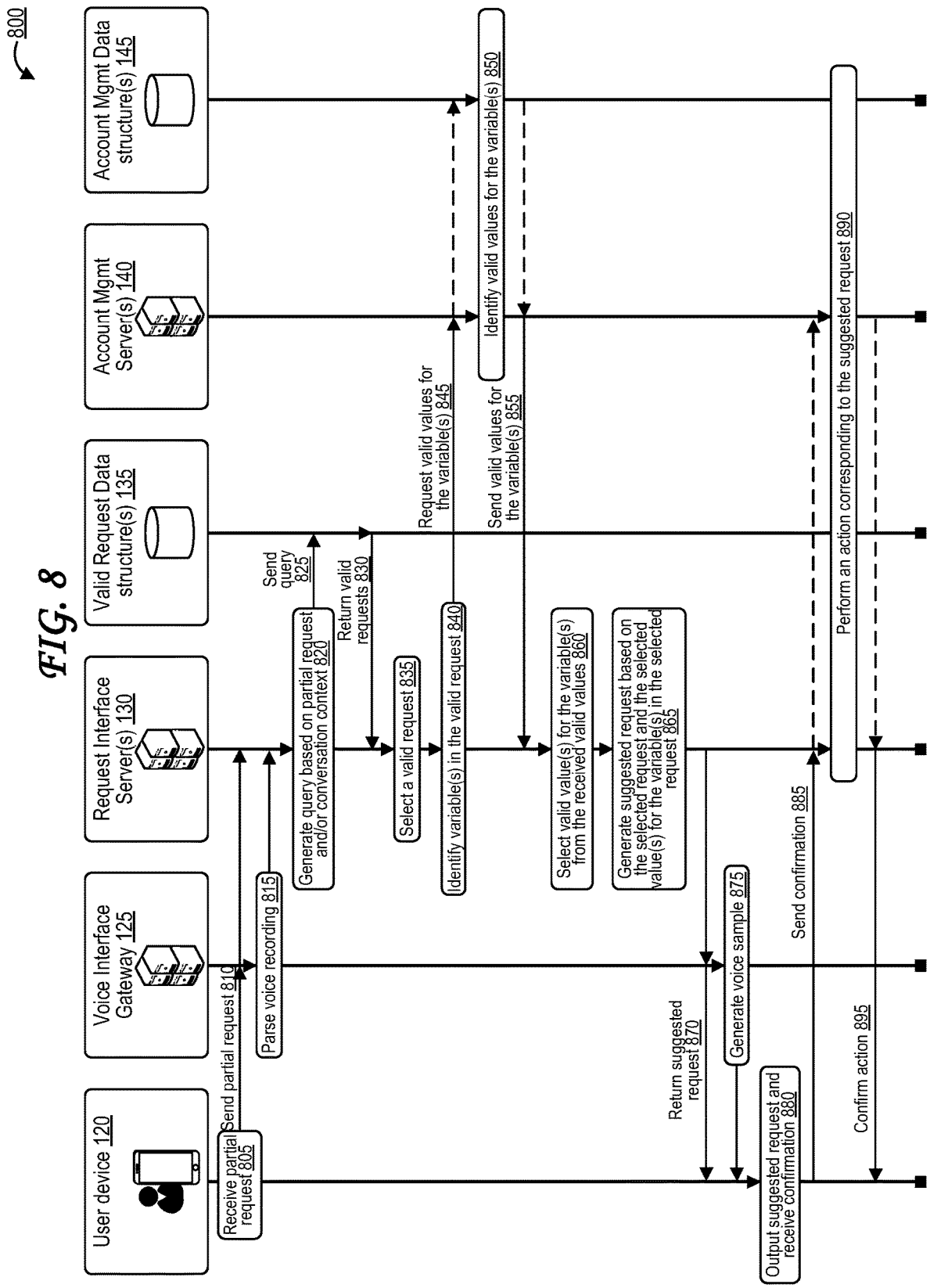
FIG. 8 is a swim lane diagram illustrating operations for context-aware conversational account management, in accordance with some examples.

FIG. 8 is a swim lane diagram illustrating operations for context-aware conversational account management. The operations 800 of FIG. 8 occur across multiple devices illustrated in the system architecture of FIG. 1, including the user device 120, the voice interface gateway 125, the request interface server(s) 130, the valid request data structure(s) 135, the account management server(s) 140, and the account management data structure(s) 145.

Figure 14:
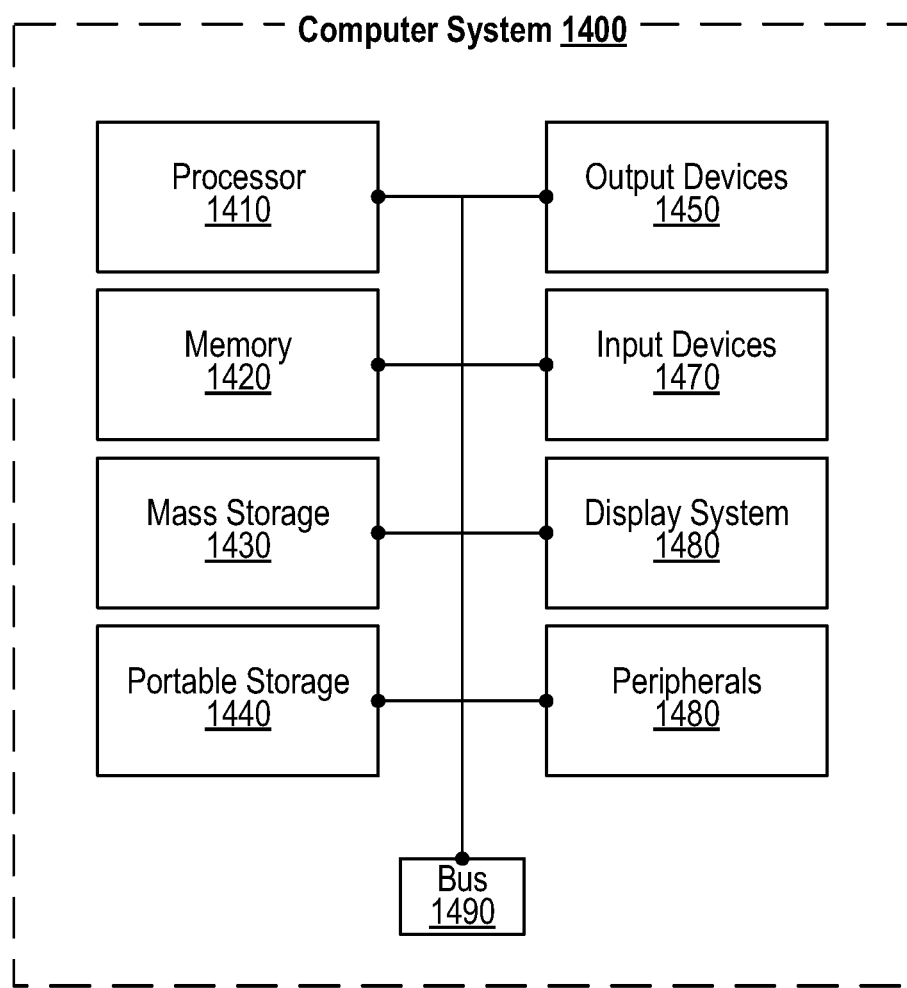
FIG. 14 is a block diagram of an exemplary computing device that may be used to implement some aspects of the subject technology.

At operation 805, the user device 120 receives a partial request via an input interface, such as a physical keyboard or keypad, a virtual keyboard or keypad, a microphone, a touchscreen, a touchpad, a mouse, any input device 1460 discussed with respect to FIG. 14, or some combination thereof. The partial request may include one or more characters, and any keyboard or keypad of the input interface, physical or virtual, may include keys or buttons corresponding to at least the one or more characters in the partial request.

At operation 810, the user device 120 sends the partial request to the request interface server 130. The user device 120 may send the partial request directly to the request interface server 130, as indicated by the horizontal arrows pointing from the user device 120 to the request interface server 130 in FIG. 8. The user device 120 may alternately send the partial request as a voice recording to the voice interface gateway 125, which may parse the voice recording into text at operation 815, and may send the text version of the partial request on to the request interface server 130.

Either way, the request interface server 130 receives the partial request from the user device 120—either directly from the user device 120 or indirectly through the voice interface gateway 125. At operation 820, the request interface server 130 generates a query based on the partial request received from the user device 120 and/or conversation context of a conversation involving the user device 120. The query may include the partial request. The conversation may be between the user device 120 and the request interface server 130, between the user device 120 and the voice interface gateway 125, or some combination thereof. For instance, if the conversation indicates or suggest a subject that the partial request concerns, the context may identify that subject, and thus the query may identify that subject.

At operation 825, the request interface server 130 queries the valid request data structure 135 using the query generated in operation 820. This is written in FIG. 8 as "send query," which may be the operation performed at operation 825 if the valid request data structure 135 is not stored at the request interface server 130. In such a case, the request interface server 130 may send the query over a network to a network address associated with the valid request data structure 135. If the valid request data structure 135 is stored at the request interface server 130, the request interface server 130 may instead query the valid request data structure 135 using the generated query without actually having to send the query over any network. At operation 830, the valid request data structure 135 returns a list of valid requests to the request interface server 130, either over a network or locally.

Figure 10:
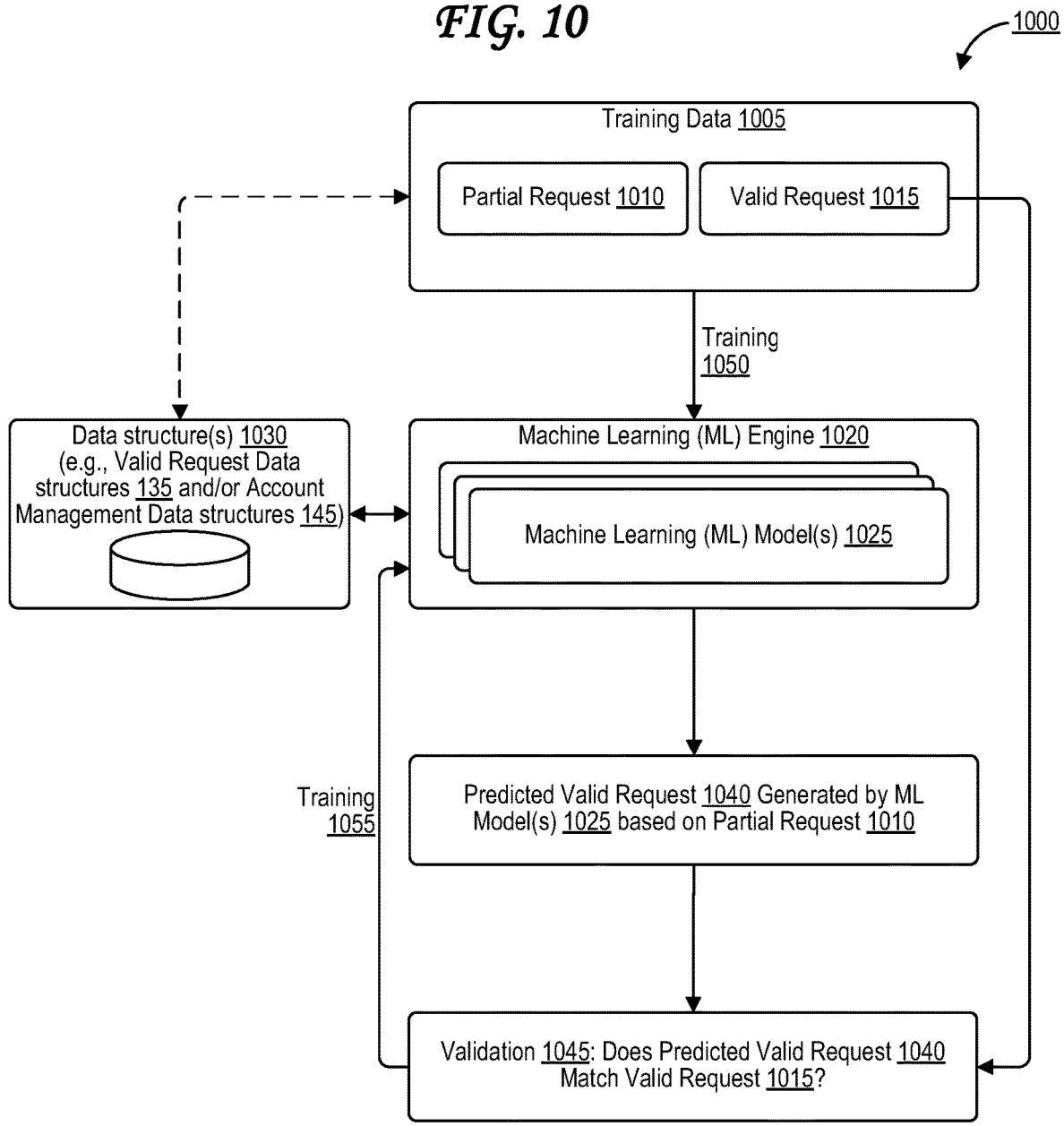
FIG. 10 is a block diagram illustrating training one or more machine learning models of a machine learning engine using training data with at least one partial request and at least one corresponding full request, in accordance with some examples.
Figure 12:
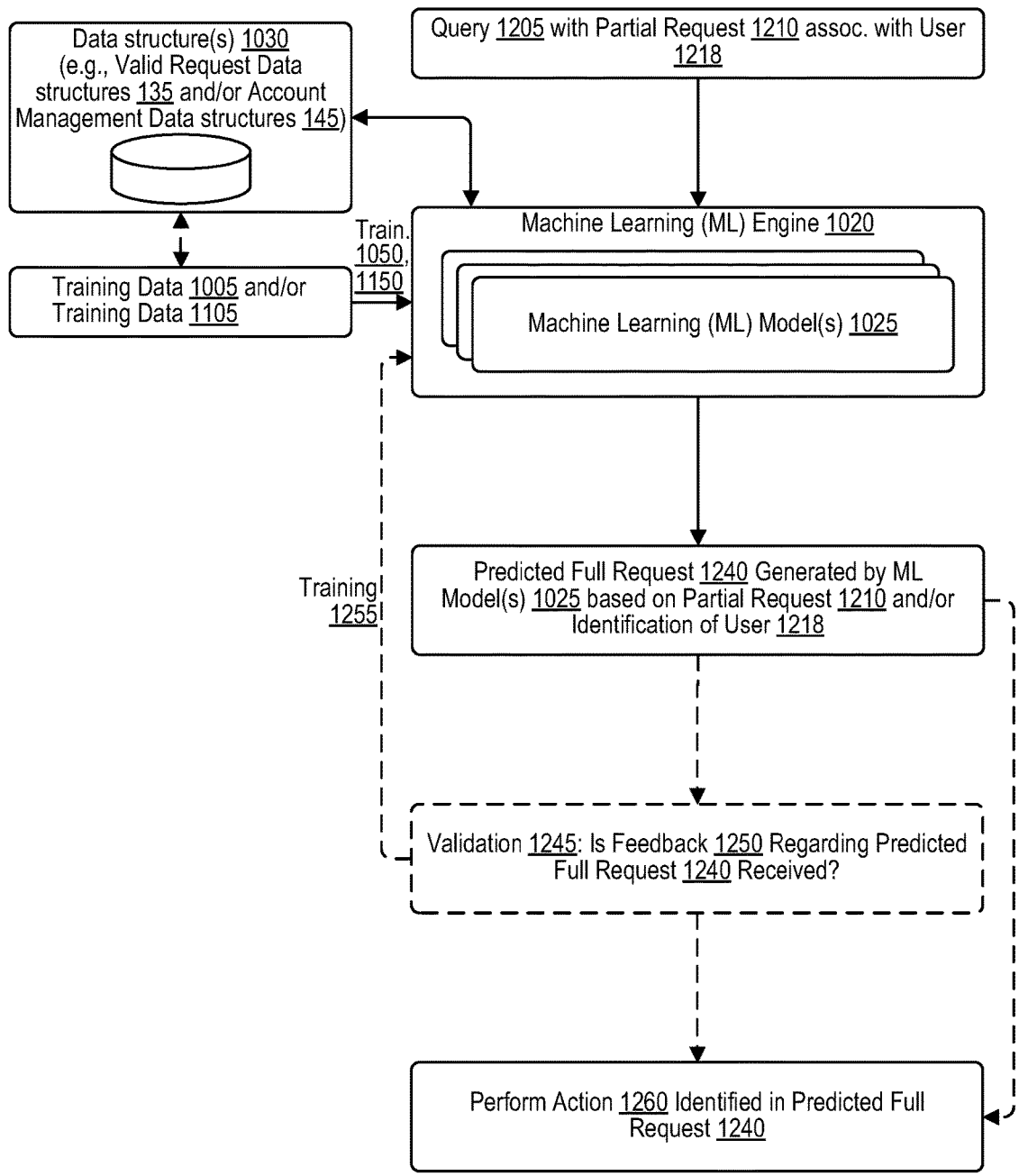
FIG. 12 is a block diagram illustrating using the one or more trained machine learning models of the machine learning engine to generate a predicted full request based on a query with a partial request, in accordance with some examples.

In some examples, instead of or in addition to generating the query in operation 820, sending the query in operation 825, and/or receiving the valid requests in operation 830, the request interface server 130 can obtain predictions of the valid requests by inputting the partial request into one or more trained machine learning models 1025 of a machine learning engine 1020 as illustrated in and/or discussed with respect to at least FIGS. 10 and 12. The one or more machine learning models 1025 and/or the machine learning engine 1020 can be stored at and/or run on the request interface server(s) 130, the account management server(s) 140, additional server(s) (not pictured), or a combination thereof.

At operation 835, the request interface server 130 selects a valid request from the list of valid requests returned by the valid request data structure 135 to the request interface server 130 at operation 830. At operation 840, the request interface server 130 that the selected valid request includes one or more variables. At operation 840, the request interface server 130 sends one or more request for one or more valid values for each of the one or more variables to one or more account management servers 140 and/or to one or more account management data structures 145. Different account management servers 140 and/or account management data structures 145 may provide valid values for different variables, depending on what information each of the different account management servers 140 and/or account management data structures 145 have access to. At operation 855, the one or more account management servers 140 and/or the one or more account management data structures 145 send a listing of one or more valid values for each of the one or more variables back to the request interface server 130.

In some examples, instead of or in addition to querying the account management data structure 145 for the valid values for the variables, the request interface server 130 can obtain at least some of the valid values from one or more data sources stored at the user device 120 or at a remote server accessible to (and/or accessed by) the user device 120 (e.g., associated with a software application running on the user device 120) and/or the request interface server 130. For example, the request interface server 130 can obtain at least some of the valid values 230 from a calendar, a to-do list, a schedule, a docket, a timetable, a timeline, a set of tickets, an agenda, an itinerary, an email client, a weather forecast, or another application, whether the data from the application is stored locally on the user device 120 or is remotely accessible at a remote served accessible to (and/or accessed by) the user device 120 and/or the request interface server 130.

Figure 11:
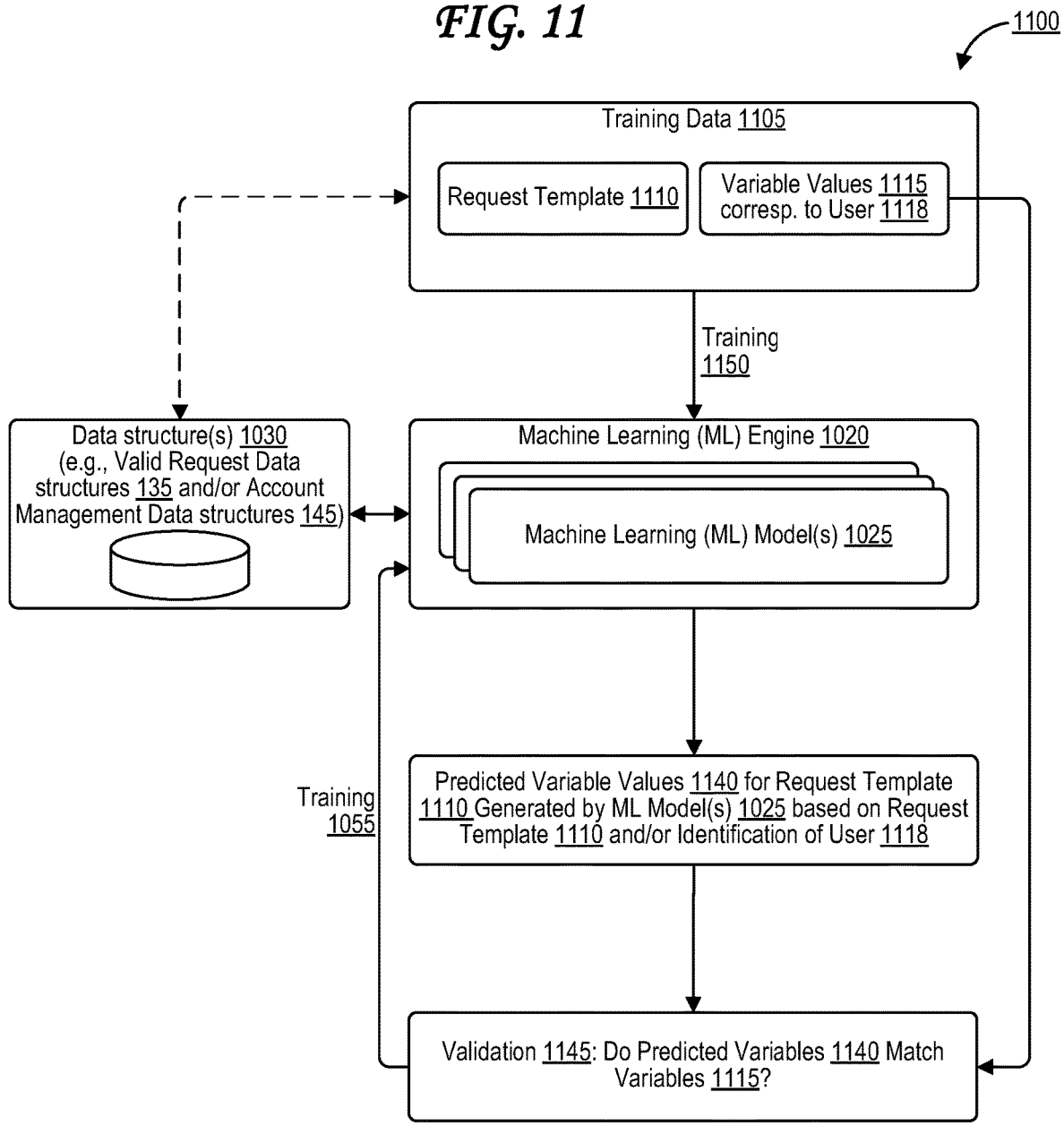
FIG. 11 is a block diagram illustrating training one or more machine learning models of a machine learning engine using training data with at least one request template and at least one corresponding set of valid variable values corresponding to a user, in accordance with some examples.

In some examples, instead of or in addition to requesting valid values for the variables at operation 845, identifying the valid values for the variables at operation 850, sending the valid values of the variables at operation 855, and/or selecting the value values at operation 860, the request interface server 130 can obtain predictions of the valid values by inputting the valid requests (or predictions thereof based on the partial request) into one or more trained machine learning models 1025 of a machine learning engine 1020 as illustrated in and/or discussed with respect to at least FIGS. 11 and 12. The one or more machine learning models 1025 and/or the machine learning engine 1020 can be stored at and/or run on the request interface server(s) 130, the account management server(s) 140, additional server(s) (not pictured), or a combination thereof.

The request interface server 130 receives the listing(s) of valid values from the one or more account management servers 140 and/or the one or more account management data structures 145. At operation 860, the request interface server 130 selects a valid value for each of the one or more variables from the listing(s) of valid values. At operation 865, the request interface server 130 generates a suggested request by plugging the variable values selected at operation 860 in place of the one or more variables of the valid request that was selected at operation 835.

At operation 870, the request interface server 130 sends the suggested request to the user device 120. The request interface server 130 may send the suggested request directly to the user device 120, as indicated by the horizontal arrows pointing from the request interface server 130 to the user device 120 in FIG. 8. The request interface server 130 may alternately or additionally send the suggested request to the to the voice interface gateway 125, which may at operation 875 generate a voice sample version of the suggested request from a text version of the suggested request, and which may send the voice sample version of the suggested request and/or the text version of the suggested request to the user device 120. In some cases, the request interface server 130 may perform operation 875 itself, in that the request interface server 130 may generate the voice sample version of the suggested request itself and send the voice sample version of the suggested request and/or the text version of the suggested request to the user device 120.

The user device 120 receives the suggested request from the request interface server 130 and/or the voice interface gateway 125. At operation 880, the user device 120 outputs the suggested request. For instance, the user device 120 may display a text version of the suggested request on a display screen, or play via a speaker a voice sample version of the suggested request. Also at operation 880, the user device 120 receives confirmation through an input interface of the user device 120, the confirmation indicating that the suggested request matches a request that a user of the user device 120 wishes to make. At operation 885, the user device 120 sends the confirmation, or some indication that the confirmation occurred, to the request interface server 130 and/or to one or more of the one or more account management servers 140.

The request interface server 130 and/or account management servers 140 receive the confirmation sent at operation 885. At operation 890 the request interface server 130 and/or the one or more account management servers 140 perform an action corresponding to the suggested request. Performing the action may include accessing, changing, or appending data in the valid request data structure 135 and/or the one or more account management data structure(s) 145 by the request interface server 130 and/or the one or more account management servers 140. At operation 895, the request interface server 130 and/or the one or more account management servers 140 confirm that the action performed in operation 890 has been completed. The user device 120 may receive the confirmation sent in operation 895 from the request interface server 130 and/or the one or more account management servers 140, and in some cases may output this confirmation, or an indication that the confirmation has been received, to the user through any output procedures discussed with respect to operation 880.

Figure 9:
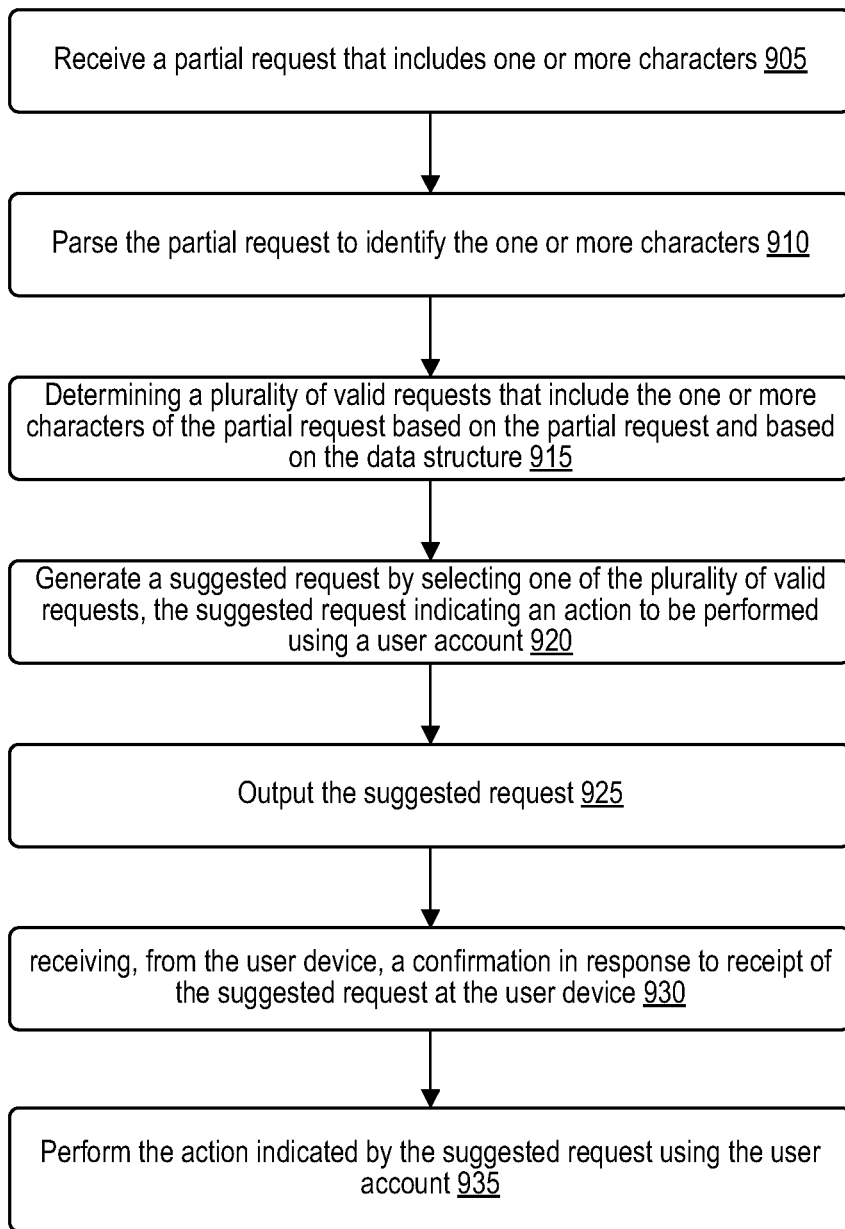
FIG. 9 is a flow diagram illustrating operations for context-aware conversational account management, in accordance with some examples.

FIG. 9 is a flow diagram illustrating operations 900 for context-aware conversational account management. The operations 900 of FIG. 9 are discussed below as being performed by a request processing system. The request processing system may refer to the voice interface gateway 125, the request interface server(s) 130, the account management server(s) 140, the user device 120, the valid request data structure(s) 135, the account management data structure(s) 145, the user device 205, the user device 305, the user device 405, the user device 505, the user device 605, one or more of the servers 710A-710J, one or more of the data structures 715A-715K, the one or more selected account management data sources 730, the data structure(s) 1030, the ML engine 1020, the neural network 1300, the computing system 1400 or some combination thereof.

In operation 905, the request processing system is configured to, and can, receive a partial request that includes one or more characters. The partial request can be received from a user device associated with a user. The user device can include an input interface through which the partial request is received. The input interface can include one or more buttons corresponding each of the one or more characters. In some examples, the one or more buttons can include a virtual button. A touchscreen of the user device can display a button icon corresponding to the virtual button at a region of the touchscreen that receives a touch input corresponding to the virtual button using a touch-sensitive surface of the touchscreen. The input interface can include, for example the virtual keyboard interface 290, a physical keyboard, a mouse, a touchscreen, another input device 1470, or a combination thereof. Examples of the partial request include the partial request 260, the partial request 360, the "Transf" text of the message 440, the "M" text of the message 470, the "Transf" text of the message 540, the "M" text of the message 570, the "Check transaction hi" text of the message 610, the partial request of operations 805-820, or a combination thereof.

In some cases, receiving the partial request may include receiving a voice recording recorded by a microphone, and generating the partial request by parsing the voice recording into text as in operation 815, for instance through the voice interface gateway 125. Examples of the user device can include the user device 120, the user device 205, the user device 305, the user device 405, the user device 505, the user device 605, the computing system 1400 or some combination thereof.

In operation 910, the request processing system is configured to, and can, parse the partial request to identify the one or more characters. The user device may include an input interface through which the partial request is received. The input interface may include one or more buttons corresponding each of the one or more characters. Each of the one or more buttons may be a virtual button, wherein a touchscreen displays a button icon corresponding to the virtual button at a region of the touchscreen that receives a touch input corresponding to the virtual button using a touch-sensitive surface of the touchscreen. The input interface may include a voice-based interface, for example using a microphone of the user device. Examples of the input interface include the virtual keyboard interface 290, another touchscreen interface, a physical keyboard interface, a keypad interface, a mouse and cursor interface, a microphone interface, any interface discussed with respect to the input devices 1470, any interface discussed with respect to the output devices 1450, any interface discussed with respect to the display system 1480, any interface discussed with respect to the peripherals 1480, or a combination thereof.

In operation 915, the request processing system is configured to, and can, determine a plurality of valid requests that include the one or more characters of the partial request based on the partial request and based on the data structure. For example, the request processing system can determine the plurality of valid requests by query a data structure for the one or more characters of the partial request and/or receiving, from the data structure in response to querying the data structure, a plurality of possible requests that include the one or more characters of the partial request. The one or more characters of the partial request may form a string of text that includes one or more words. In some cases, the plurality of valid requests may include each of the one or more words. Examples of the data structure include the valid request data structure(s) 135, the account management data structure(s) 145, the data structure(s) 1030, or a combination thereof.

In some examples, determining the plurality of valid requests based on the partial request and based on the data structure includes generating the plurality of valid requests using one or more trained machine learning models based on using the partial request as an input to the one or more trained machine learning models. The one or more trained machine learning models are trained based on information from the data structure. Examples of the one or more trained machine learning models include the one or more trained machine learning models 1025 of machine learning engine 1020, the NN 1300, or a combination thereof. Examples of the plurality of valid requests as generated by the one or more trained machine learning models can include one or more of the predicted valid request 1040, the predicted variable values 1140, the predicted full request 1240, or a combination thereof. Examples of the training of the one or more machine learning models based on the data structure include the training 1050, the training 1055, the training 1150, the training 1155, other training based on the data structure(s) 1030, or a combination thereof.

In some examples, the one of the plurality of valid requests includes a variable. Generating the suggested request can includes providing a value for the variable. The value can be associated with the user account. In some examples, the request processing system is configured to, and can, generate the value for the variable using one or more trained machine learning models based on using the one of the plurality of valid requests as an input to the one or more trained machine learning models. Examples of the generated value for the variable include the predicted variable values 1140 and/or the predicted full request 1240. In some examples, the request processing system is configured to, and can, use the suggested request and the confirmation (of operation 930) to update the one or more trained machine learning models. Examples of the updating of the one or more trained ML models include the training 1050, the training 1155, the training 1255, or a combination thereof. In some examples, the request processing system is configured to, and can, use the suggested request and the confirmation to update the one or more trained machine learning models.

In some examples, the request processing system is configured to, and can, identify the value within a second data structure. Examples of the second data structure can include, for example, the valid request data structure(s) 135, the account management data structure(s) 145, the data structure(s) 1030, or a combination thereof. The request processing system can identify the second data structure based on context associated with the partial request. In some examples, the value matches a previous value used in one or more previous actions performed using the user account. For instance, the value can be an account identifier that matches an account identifier of an account for which a previous action was undertaken. The value can be a user identifier that matches a user identifier of a user for which a previous action was undertaken. The value can be an identifier of another entity (e.g., institution, merchant, etc.) that matches an identifier for which a previous action was undertaken. In some examples, the value is an account identifier corresponding to the user account. The account identifier can identify at least one of an account type of the user account, an institution associated with the user account, an alphanumeric code associated with user account, or a combination thereof. In some examples, the value includes a secondary account identifier corresponding to a secondary account, and performing the action (as in operation 935) includes transferring funds between the user account and the secondary account. The secondary account identifier identifies at least one of an account type of the secondary account, an institution associated with the secondary account, an alphanumeric code associated with the secondary account, or a combination thereof. In some examples, the value is a numerical value, and the second data structure identifies one or more previous transactions associated with the user account. In some examples, performing the action (as in operation 935) includes transferring a quantity of an asset between the user account and a second account, the quantity of the asset based on the numerical value.

In operation 920, the request processing system is configured to, and can, generate a suggested request by selecting one of the plurality of possible requests, the suggested request indicating an action to be performed using a user account. Examples of the suggested request include the suggested request 265, the suggested request 365, the full message 440, the full message 470, the full message 540, the full message 570, the full message 610, the suggested request of operations 865-895, the predicted valid request 1040, the predicted variable values 1140, the predicted full request 1240, or a combination thereof. The user account can be a user account associated with the user of operation 905.

In operation 925, the request processing system is configured to, and can, output the suggested request. For example, the request processing system can display the suggested request on a display, as in the suggested request 265, the suggested request 365, the full message 440, the full message 470, the full message 540, the full message 570, and the full message 610. The request processing system can play the suggested request through a speaker, headphone, or other audio output device as in operations 875-880.

In operation 930, the request processing system is configured to, and can, receive, from the user device, a confirmation in response to receipt of the suggested request at the user device. The confirmation can include a selection of the suggested request from a plurality of options. The confirmation can include an input at a confirmation button or other indicator. The feedback 1250 can include the confirmation.

In operation 935, the request processing system is configured to, and can, perform the action indicated by the suggested request using the user account associated with the user in response to receiving the confirmation. Performing the action can include transferring a quantity of an asset between the user account and a second account. Performing the action can include determining a balance stored in the user account and outputting the balance. Performing the action can include opening the user account. Performing the action can include closing the user account. Performing the action can include transferring one or more assets from the user account to a transferee account. Performing the action can include transferring one or more assets from a transferor account to the user account. Performing the action can include identifying an anchor page 620, sending the anchor page 620 (or a pointer thereto) to the user device, triggering the user device to display the anchor page 620, and/or displaying the anchor page 620 at the user device. Performing the action can include identifying a transaction history associated with the user account, as in the transaction history of FIG. 6.

In some examples, determining the plurality of valid requests (as in operation 915) and generating the suggested request (as in operation 920) occur in real-time while still receiving at least a subset of the one or more characters of the partial request (as received in operation 905). In some examples, the request processing system is configured to, and can, update the plurality of valid requests (as determined in operation 915) and/or update the suggested request (as generated in operation 920) in real-time based on additional character(s) received as part of the partial request (as received in operation 905). In some examples, the request processing system is configured to, and can, update the plurality of valid requests (as determined in operation 915) and/or update the suggested request (as generated in operation 920) in real-time based on removal of character(s) from at least part of the partial request (as received in operation 905). In some examples, the request processing system is configured to, and can, update the plurality of valid requests (as determined in operation 915) and/or update the suggested request (as generated in operation 920) in real-time based on editing of the partial request (as received in operation 905). The techniques for updating the plurality of valid requests and/or update the suggested request can include any of the techniques discussed herein for determining the plurality of valid requests and/or for generating the suggested request.

FIG. 10 is a block diagram 1000 illustrating training one or more machine learning models 1025 of a machine learning (ML) engine 1020 using training data 1005 with at least one partial request 1010 and at least one corresponding valid request 1015. The training data 1005, including at least one partial request 1010 and at least one valid request 1015, are input into the machine learning engine 1020, which performs training 1050 using at least the training data 1005 to generate and/or train one or more machine learning (ML) models 1025. Examples of a partial request 1010 include the partial request 260 and the partial request 360. Using the training 1050, the ML engine 1020 can train one or more of the ML models 1025 to generate a predicted valid request 1040 based on a partial request 1010. In some examples, the training data 1005 (e.g., the partial request 1010 and/or the valid request 1015) can be pulled from one or more data structure(s) 1030, which may include the valid request data structure(s) 135 and/or the account management data structure(s) 145.

In some examples, the valid request 1015 that is part of the training data 1005 can include one or more variables, as in the valid requests 220 with the variables 235 of FIG. 2 and/or the valid requests 320 with the variables 335 of FIG. 3. A valid request 1015 with one or more variables may be referred to as a request template, into which values may be inserted for the variables in the request template. Thus, the ML engine 1020 can use the training 1050 to train the one or more ML models 1025 to generate a predicted valid request 1040 that is a request template, based on the partial request 1010.

In some examples, the machine learning (ML) engine 1020 can receive data from data structure(s) 1030, such as the valid request data structure(s) 135 and/or the account management data structure(s) 145. The machine learning (ML) engine 1020 can use the data from the data structure(s) 1030 to perform training of the one or more ML models 1025 instead of or in addition to using the training data 1005. In some examples, the machine learning (ML) engine 1020 can use the data from the data structure(s) 1030 to train the one or more ML models 1025 to generate valid values for variables as illustrated in FIG. 11.

Once the one or more ML models 1025 of the ML engine 1020 generate the predicted valid request 1040 based on the partial request 1010, the ML engine 1020 can perform validation 1045. Validation 1045 includes comparing the predicted valid request 1040 to the valid request 1015. If the predicted valid request 1040 matches the valid request 1015, then the one or more ML engine 1020 generated the predicted valid request 1040 successfully, and the weights corresponding to generation of the predicted valid request 1040 by the one or more ML models 1025 can be reinforced through additional training 1055 by the ML engine 1020 of the one or more ML models 1025 in real-time automatically based on the validation 1045 and/or based on the predicted valid request 1040. If the predicted valid request 1040 is different from the valid request 1015, then the one or more ML engine 1020 generated an incorrect predicted valid request 1040, and the ML engine can reassign the weights corresponding to generation of the predicted valid request 1040 by the one or more ML models 1025 through additional training 1055 by the ML engine 1020 of the one or more ML models 1025 in real-time automatically based on the validation 1045, based on the valid request 1015, and/or based on one or more differences between the valid request 1015 and the predicted valid request 1040.

In some examples, the ML engine 1020 can train and/or generate different ML models of the one or more ML models 1025 to generate different types of outputs. In some examples, the ML engine 1020 can train different ML models of the one or more ML models 1025 using different training data. For instance, the ML engine 1020 uses the training 1050 with the training data 1005 to train a first ML model of the one or more of the ML models 1025 to generate a predicted valid request 1040 based on a query 1205 with a partial request 1210. The predicted valid request 1040 may be a request template with one or more variables. The ML engine 1020 can use the training 1150 of FIG. 11 based on the training data 1105 of FIG. 11 to train a second ML model of the one or more of the ML models 1025 to generate predicted variable values 1140 based on a request template 1110. The ML engine 1020 can use other training based on other training data to train a third ML model of the one or more ML models to generate other types of data.

FIG. 11 is a block diagram 1100 illustrating training one or more machine learning models 1025 of a machine learning (ML) engine 1020 using training data 1105 with at least one request template 1110 and at least one corresponding set of valid variable values 1115 corresponding to a user 1118. The training data 1105, including at least one request template 1110 and at least one variable values 1115, are input into the machine learning engine 1020, which performs training 1150 using at least the training data 1105 to generate and/or train one or more machine learning (ML) models 1025. The request template 1110 may include one or more variables, as in the valid requests 220 with the variables 235 of FIG. 2 and/or the valid requests 320 with the variables 335 of FIG. 3.

Using the training 1150, the ML engine 1020 can train one or more of the ML models 1025 to generate predicted variable values 1140 based on a request template 1110. In some examples, the training data 1105 (e.g., the request template 1110 and/or the valid variable values 1115 corresponding to the user 1118) can be pulled from one or more data structure(s) 1030, which may include the valid request data structure(s) 135 and/or the account management data structure(s) 145.

In some examples, the machine learning (ML) engine 1020 can receive data from data structure(s) 1030, such as the valid request data structure(s) 135 and/or the account management data structure(s) 145. The machine learning (ML) engine 1020 can use the data from the data structure(s) 1030 to perform training of the one or more ML models 1025 instead of or in addition to using the training data 1105. In some examples, the machine learning (ML) engine 1020 can use the data from the data structure(s) 1030 to train the one or more ML models 1025 to generate valid values for variables as illustrated in FIG. 11. For example, the variable values 1115 corresponding to the user 1118 in the training data 1105 can be obtained by the ML engine 1020 by querying the data structures 1030 with an identifier associated with the user 1118. The valid variable values 1115 can, for example, identify settings associated with the user 1118, institutions associated with the user 1118, accounts settings associated with the user 1118, account types associated with the user 1118, merchants associated with the user 1118 (e.g., that the user 1118 has transacted with), an asset associated with the user 1118, a transferor transferring to the user 1118, a transferee being transferred to by the user 1118, any of the above types of variable values associated with the transferor and/or the transferee instead of the user 1118, or a combination thereof. Examples of the variable values 1115 include the valid values 230 for the variables 235, the valid values 330 for the variables 335, the valid values 430 for the variables 435, the valid values 530 for the variables 535, or a combination thereof.

Once the one or more ML models 1025 of the ML engine 1020 generates the predicted variable values 1140 based on the request template 1110, the ML engine 1020 can perform validation 1145. Validation 1145 includes comparing the predicted variable values 1140 to the variable values 1115. If the predicted variable values 1140 match the variable values 1115, then the one or more ML engine 1020 generated the predicted variable values 1140 successfully, and the weights corresponding to generation of the predicted variable values 1140 by the one or more ML models 1025 can be reinforced through additional training 1155 by the ML engine 1020 of the one or more ML models 1025 in real-time automatically based on the validation 1145 and/or based on the predicted variable values 1140. If the predicted variable values 1140 is different from the variable values 1115, then the one or more ML engine 1020 generated incorrect predicted variable values 1140, and the ML engine can reassign the weights corresponding to generation of the predicted variable values 1140 by the one or more ML models 1025 through additional training 1155 by the ML engine 1020 of the one or more ML models 1025 in real-time automatically based on the validation 1145, based on the variable values 1115, and/or based on one or more differences between the variable values 1115 and the predicted variable values 1140.

FIG. 12 is a block diagram 1200 illustrating using the one or more trained machine learning models 1025 of the machine learning engine 1020 to generate a predicted full request 1240 based on a query 1205 with a partial request 1210. The ML models 1025 are already generated and trained by the ML engine 1020. At least a subset of the one or more ML models 1025 are already trained by the ML engine 1020 using the training data 1005 via the training 1050 and/or the training 1055. At least a subset of the one or more ML models 1025 are already trained by the ML engine 1020 using the training data 1105 via the training 1150 and/or the training 1155.

Examples of the query 1205 include the query 210, the query 310, the query 410, and the query 510. Examples of the partial request 1010 include the partial request 260 and the partial request 360. The one or more ML models 1025 of the ML engine 1020 can use the partial request 1010 and/or an identification of the user 1218 as input(s) to the one or more ML models 1025. The one or more ML models 1025 of the ML engine 1020 can output a predicted full request 1240 based on the partial request 1210 and/or identification of the user 1218. The predicted full request 1240 can include a request template such as the predicted valid request 1040, with variables filled in with valid variables such as the predicted variable values 1140.

In some examples, the ML engine 1020 may receive feedback 1250 based on the predicted full request 1240, and may perform validation 1245 based on the feedback 1250. The feedback 1250 may be positive or negative. Feedback 1250 that is positive, for example, may include receipt of a user interface input through a user interface, the user interface input selecting the predicted full request 1240 from a set of choices or otherwise confirming that the predicted full request 1240 is accurate to the user's intent behind the partial request 1210. Feedback 1250 that is negative, for example, may include receipt of a user interface input through a user interface, the user interface input selecting a different choice than the predicted full request 1240 from a set of choices or otherwise indicating that the predicted full request 1240 is different from the user's intent behind the partial request 1210. If the feedback 1250 is positive, then the one or more ML engine 1020 generated the predicted full request 1240 successfully, and the weights corresponding to generation of the predicted full request 1240 by the one or more ML models 1025 can be reinforced through additional training 1255 by the ML engine 1020 of the one or more ML models 1025 in real-time automatically based on the validation 1245 and/or based on the predicted full request 1240. If the feedback 1250 is negative, then the one or more ML engine 1020 generated an incorrect predicted full request 1240, and the ML engine 1020 can reassign the weights corresponding to generation of the predicted full request 1240 by the one or more ML models 1025 through additional training 1255 by the ML engine 1020 of the one or more ML models 1025 in real-time automatically based on the validation 1245, based on the feedback 1250, and/or based on the predicted full request 1240.

The system that includes the ML engine 1020 and/or the ML models 1025 (e.g., the request interface server(s) 130 and/or the account management server(s) 140) can perform an action 1260 identified in the predicted full request 1240 after generation of the predicted full request 1240 and/or after receipt of the feedback 1250 (e.g., if the feedback 1250 is positive). For example, if the predicted full request 1240 involves a request to process a transaction, then the system can perform the action 1260 by processing the transaction. If the predicted full request 1240 involves a request to transfer an asset between accounts (e.g., two accounts associated with the same user or two accounts associated with two different users), then the system can perform the action 1260 by transferring an asset between the accounts.

Figure 13:
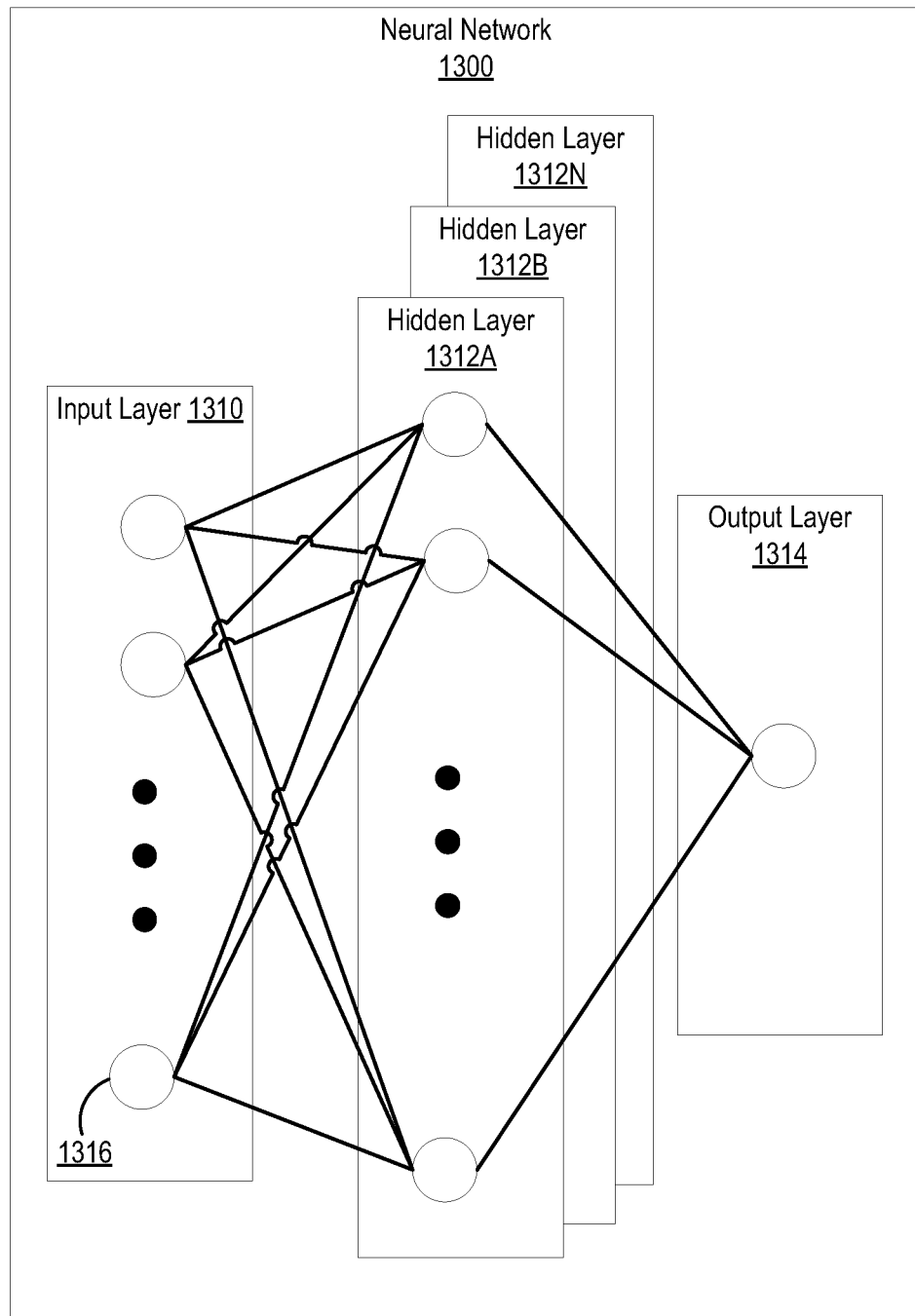
FIG. 13 is a block diagram illustrating an example of a neural network that can be used by the machine learning engine to generate predicted full requests and/or variables, in accordance with some examples.

FIG. 13 is a block diagram illustrating an example of a neural network (NN) 1300 that can be used by the trained machine learning engine 1025 that generates predicted valid requests 1040, predicted variable values 1140, and/or predicted full requests 1240. The neural network 1300 can include any type of deep network, such as a convolutional neural network (CNN), an autoencoder, a deep belief net (DBN), a Recurrent Neural Network (RNN), a Generative Adversarial Networks (GAN), and/or other type of neural network. The neural network 1300 may be an example of the ML engine 1020, one of the one or more trained ML models 1025, or a combination thereof.

An input layer 1310 of the neural network 1300 includes input data. The input data of the input layer 1310 can include data representing, for example, a partial request 1010, a request template 1110, a query 1205, a partial request 1210, an identification of a user 1218, or a combination thereof. In an illustrative example, the input data of the input layer 1310 can include data representing a query 1205 with a partial request 1210 and an identification of a user 1218.

The neural network 1300 includes multiple hidden layers 1312A, 1312B, through 1312N. The hidden layers 1312A, 1312B, through 1312N include "N" number of hidden layers, where "N" is an integer greater than or equal to one. The number of hidden layers can be made to include as many layers as needed for the given application. The neural network 1300 further includes an output layer 1314 that provides an output resulting from the processing performed by the hidden layers 1312A, 1312B, through 1312N. In some examples, the output layer 1314 can provide a predicted valid request 1040, predicted variable values 1140, a predicted full request 1240, or a combination thereof.

The neural network 1300 is a multi-layer neural network of interconnected filters. Each filter can be trained to learn a feature representative of the input data. Information associated with the filters is shared among the different layers and each layer retains information as information is processed. In some cases, the neural network 1300 can include a feed-forward network, in which case there are no feedback connections where outputs of the network are fed back into itself. In some cases, the network 1300 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 1310 can activate a set of nodes in the first hidden layer 1312A. For example, as shown, each of the input nodes of the input layer 1310 can be connected to each of the nodes of the first hidden layer 1312A. The nodes of a hidden layer can transform the information of each input node by applying activation functions (e.g., filters) to this information. The information derived from the transformation can then be passed to and can activate the nodes of the next hidden layer 1312B, which can perform their own designated functions. Example functions include convolutional functions, downscaling, upscaling, data transformation, and/or any other suitable functions. The output of the hidden layer 1312B can then activate nodes of the next hidden layer, and so on. The output of the last hidden layer 1312N can activate one or more nodes of the output layer 1314, which provides a processed output image. In some cases, while nodes (e.g., node 1316) in the neural network 1300 are shown as having multiple output lines, a node has a single output and all lines shown as being output from a node represent the same output value.

In some cases, each node or interconnection between nodes can have a weight that is a set of parameters derived from the training of the neural network 1300. For example, an interconnection between nodes can represent a piece of information learned about the interconnected nodes. The interconnection can have a tunable numeric weight that can be tuned (e.g., based on a training dataset), allowing the neural network 1300 to be adaptive to inputs and able to learn as more and more data is processed.

The neural network 1300 is pre-trained to process the features from the data in the input layer 1310 using the different hidden layers 1312A, 1312B, through 1312N in order to provide the output through the output layer 1314.

FIG. 14 illustrates an exemplary computing system 1400 that may be used to implement some aspects of the subject technology. For example, any of the computing devices, computing systems, network devices, network systems, servers, and/or arrangements of circuitry described herein may include at least one computing system 1400, or may include at least one component of the computer system 1400 identified in FIG. 14. The computing system 1400 of FIG. 14 includes one or more processors 1410 and memory 1420. Each of the processor(s) 1410 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 1410 may include one or more cores, either integrated onto a single chip or spread across multiple chips connected or coupled together. Memory 1420 stores, in part, instructions and data for execution by processor 1410. Memory 1420 can store the executable code when in operation. The system 1400 of FIG. 14 further includes a mass storage device 1430, portable storage medium drive(s) 1440, output devices 1450, user input devices 1460, a graphics display 1470, and peripheral devices 1480.

The components shown in FIG. 14 are depicted as being connected via a single bus 1490. However, the components may be connected through one or more data transport means. For example, processor unit 1410 and memory 1420 may be connected via a local microprocessor bus, and the mass storage device 1430, peripheral device(s) 1480, portable storage device 1440, and display system 1470 may be connected via one or more input/output (I/O) buses.

Mass storage device 1430, which may be implemented with a magnetic disk drive or an optical disk drive, is a non-volatile storage device for storing data and instructions for use by processor unit 1410. Mass storage device 1430 can store the system software for implementing some aspects of the subject technology for purposes of loading that software into memory 1420.

Portable storage device 1440 operates in conjunction with a portable non-volatile storage medium, such as a floppy disk, compact disk or Digital video disc, to input and output data and code to and from the computer system 1400 of FIG. 14. The system software for implementing aspects of the subject technology may be stored on such a portable medium and input to the computer system 1400 via the portable storage device 1440.

The memory 1420, mass storage device 1430, or portable storage 1440 may in some cases store sensitive information, such as transaction information, health information, or cryptographic keys, and may in some cases encrypt or decrypt such information with the aid of the processor 1410. The memory 1420, mass storage device 1430, or portable storage 1440 may in some cases store, at least in part, instructions, executable code, or other data for execution or processing by the processor 1410.

Output devices 1450 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 1470. The printer may be inkjet, laserjet, thermal, or some combination thereof. In some cases, the output device circuitry 1450 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 1450 may include any ports, plugs, antennae, wired or wireless transmitters, wired or wireless transceivers, or any other components necessary for or usable to implement the communication types listed above, such as cellular Subscriber Identity Module (SIM) cards.

Input devices 1460 may include circuitry providing a portion of a user interface. Input devices 1460 may include an alpha-numeric keypad, such as a keyboard, for inputting alpha-numeric and other information, or a pointing device, such as a mouse, a trackball, stylus, or cursor direction keys. Input devices 1460 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, wireless local area network (WAN) signal transfer, cellular data network wireless signal transfer, personal area network (PAN) signal transfer, wide area network (WAN) signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 1460 may include any ports, plugs, antennae, wired or wireless receivers, wired or wireless transceivers, or any other components necessary for or usable to implement the communication types listed above, such as cellular SIM cards.

Input devices 1460 may include receivers or transceivers used for positioning of the computing system 1400 as well. These may include any of the wired or wireless signal receivers or transceivers. For example, a location of the computing system 1400 can be determined based on signal strength of signals as received at the computing system 1400 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 1400 such as a router, modem, switch, hub, bridge, gateway, or repeater. These may also include Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 1460 may include receivers or transceivers corresponding to one or more of these GNSS systems.

Display system 1470 may include a liquid crystal display (LCD), a plasma display, an organic light-emitting diode (OLED) display, an electronic ink or "e-paper" display, a projector-based display, a holographic display, or another suitable display device. Display system 1470 receives textual and graphical information, and processes the information for output to the display device. The display system 1470 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1480 may include any type of computer support device to add additional functionality to the computer system. For example, peripheral device(s) 1480 may include one or more additional output devices of any of the types discussed with respect to output device 1450, one or more additional input devices of any of the types discussed with respect to input device 1460, one or more additional display systems of any of the types discussed with respect to display system 1470, one or more memories or mass storage devices or portable storage devices of any of the types discussed with respect to memory 1420 or mass storage 1430 or portable storage 1440, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 1400 of FIG. 14 can include those typically found in computer systems that may be suitable for use with some aspects of the subject technology and represent a broad category of such computer components. That said, the computer system 1400 of FIG. 14 can be customized and specialized for the purposes discussed herein and to carry out the various operations discussed herein, with specialized hardware components, specialized arrangements of hardware components, and/or specialized software. Thus, the computer system 1400 of FIG. 14 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an ebook reader, a media player device (portable or otherwise), a vehicle-based computer, another type of computing device, or some combination thereof. The computer system 1400 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 1400 may also use a Basic Input/Output System (BIOS) or Unified Extensible Firmware Interface (UEFI) as a layer upon which the operating system(s) are run.

In some cases, the computer system 1400 may be part of a multi-computer system that uses multiple computer systems 1400, each for one or more specific tasks or purposes. For example, the multi-computer system may include multiple computer systems 1400 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 1400 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 1420, the mass storage 1430, the portable storage 1440, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEP-ROM), cache memory (L1/L2/L3/L4/L5/L6), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 1410 for execution. A bus 1490 carries the data to system RAM or another memory 1420, from which a processor 1410 retrieves and executes the instructions. The instructions received by system RAM or another memory 1420 can optionally be stored on a fixed disk (mass storage device 1430/portable storage 1440) either before or after execution by processor 1410. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 1400 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

Illustrative aspects of the disclosure include:

Aspect 1. A method of context-aware account management, the method comprising: receiving a partial request that includes one or more characters; parsing the partial request to identify the one or more characters; determining a plurality of valid requests that include the one or more characters of the partial request based on the partial request and based on a data structure; generating a suggested request by selecting one of the plurality of valid requests, the suggested request indicating an action to be performed using a user account; sending the suggested request; receiving a confirmation associated with the suggested request; and performing the action indicated by the suggested request using the user account.

Aspect 2. The method of Aspect 1, wherein determining the plurality of valid requests based on the partial request and based on the data structure includes: querying the data structure for the one or more characters of the partial request; and receiving the plurality of valid requests that include the one or more characters of the partial request in response to querying the data structure.

Aspect 3. The method of any of Aspects 1 to 2, wherein determining the plurality of valid requests based on the partial request and based on the data structure includes: generating the plurality of valid requests using one or more trained machine learning models based on using the partial request as an input to the one or more trained machine learning models, the one or more trained machine learning models having been trained based on information from the data structure.

Aspect 4. The method of Aspect 3, further comprising: using the suggested request and the confirmation to update the one or more trained machine learning models.

Aspect 5. The method of any of Aspects 1 to 4, wherein receiving the partial request includes: receiving a voice recording recorded by a microphone; and generating the partial request by parsing the voice recording into text.

Aspect 6. The method of any of Aspects 1 to 5, wherein a user device associated with the user account includes an input interface through which the partial request is received, wherein the input interface includes one or more buttons corresponding each of the one or more characters.

Aspect 7. The method of Aspect 6, wherein each of the one or more buttons is a virtual button, wherein a touchscreen displays a button icon corresponding to the virtual button at a region of the touchscreen that receives a touch input corresponding to the virtual button using a touch-sensitive surface of the touchscreen.

Aspect 8. The method of any of Aspects 1 to 7, wherein the one or more characters of the partial request form a string of text that includes one or more words, wherein the plurality of valid requests include each of the one or more words.

Aspect 9. The method of any of Aspects 1 to 8, wherein the one of the plurality of valid requests includes a variable, and wherein generating the suggested request includes providing a value for the variable, wherein the value is associated with the user account.

Aspect 10. The method of Aspect 9, further comprising: generating the value for the variable using one or more trained machine learning models based on using the one of the plurality of valid requests as an input to the one or more trained machine learning models.

Aspect 11. The method of Aspect 10, further comprising: using the suggested request and the confirmation to update the one or more trained machine learning models.

Aspect 12. The method of any of Aspects 9 to 11, further comprising: identifying the value within a second data structure.

Aspect 13. The method of Aspect 12, further comprising: identifying the second data structure based on context associated with the partial request.

Aspect 14. The method of any of Aspects 12 to 13, wherein the value matches a previous value used in one or more previous actions performed using the user account.

Aspect 15. The method of any of Aspects 12 to 14, wherein the value is an account identifier corresponding to the user account, wherein the account identifier identifies at least one of an account type of the user account, an institution associated with the user account, and an alphanumeric code associated with user account.

Aspect 16. The method of any of Aspects 12 to 15, wherein the value is a secondary account identifier corresponding to a secondary account, wherein performing the action includes transferring funds between the user account and the secondary account, wherein the secondary account identifier identifies at least one of an account type of the secondary account, an institution associated with the secondary account, and an alphanumeric code associated with the secondary account.

Aspect 17. The method of any of Aspects 12 to 16, wherein the value is a numerical value, and wherein the second data structure identifies one or more previous transactions associated with the user account.

Aspect 18. The method of Aspect 17, wherein performing the action includes transferring a quantity of an asset between the user account and a second account, the quantity of the asset based on the numerical value.

Aspect 19. The method of any of Aspects 1 to 18, wherein performing the action includes determining a balance stored in the user account and outputting the balance.

Aspect 20. The method of any of Aspects 1 to 19, wherein performing the action includes opening the user account.

Aspect 21. The method of any of Aspects 1 to 20, wherein performing the action includes closing the user account.

Aspect 22. The method of any of Aspects 1 to 21, wherein performing the action includes transferring one or more assets from the user account to a transferee account.

Aspect 23. The method of any of Aspects 1 to 22, wherein performing the action includes transferring one or more assets from a transferor account to the user account.

Aspect 24. The method of any of Aspects 1 to 23, wherein determining the plurality of valid requests and generating the suggested request occur in real-time while still receiving at least a subset of the one or more characters of the partial request.

Aspect 25. The method of any of Aspects 1 to 24, further comprising: updating at least one of the plurality of valid requests and the suggested request in real-time based on receipt of one or more edits to the partial request.

Aspect 26. A system of context-aware account management, the system comprising: one or more communication transceivers; one or more memory units storing instructions; and one or more processors, wherein execution the instructions by the one or more processors causes the one or more processors to: receive a partial request that includes one or more characters, parse the partial request to identify the one or more characters, determine a plurality of valid requests that include the one or more characters of the partial request based on the partial request and based on a data structure, generate a suggested request by selecting one of the plurality of valid requests, the suggested request indicating an action to be performed, output the suggested request, receive a confirmation associated with the suggested request, and perform the action indicated by the suggested request using a user account.

Aspect 27. The system of Aspect 26, wherein, to determine the plurality of valid requests based on the partial request and based on the data structure, the one or more processors: query the data structure for the one or more characters of the partial request, and receive the plurality of valid requests that include the one or more characters of the partial request in response to querying the data structure.

Aspect 28. The system of any of Aspects 26 to 27, wherein, to determine the plurality of valid requests based on the partial request and based on the data structure, the one or more processors: generate the plurality of valid requests using one or more trained machine learning models based on using the partial request as an input to the one or more trained machine learning models, the one or more trained machine learning models having been trained based on information from the data structure.

Aspect 29. The method of Aspect 28, wherein execution the instructions by the one or more processors causes the one or more processors to further: use the suggested request and the confirmation to update the one or more trained machine learning models.

Aspect 30. The system of any of Aspects 26 to 29, wherein to receive the partial request, the one or more processors: receive a voice recording recorded by a microphone, and generate the partial request by parsing the voice recording into text.

Aspect 31. The system of any of Aspects 26 to 30, wherein a user device associated with the user account includes an input interface through which the partial request is received, wherein the input interface includes one or more buttons corresponding each of the one or more characters.

Aspect 32. The method of Aspect 31, wherein each of the one or more buttons is a virtual button, wherein a touchscreen displays a button icon corresponding to the virtual button at a region of the touchscreen that receives a touch input corresponding to the virtual button using a touch-sensitive surface of the touchscreen.

Aspect 33. The system of any of Aspects 26 to 32, wherein the one or more characters of the partial request form a string of text that includes one or more words, wherein the plurality of valid requests include each of the one or more words.

Aspect 34. The system of any of Aspects 26 to 33, wherein the one of the plurality of valid requests includes a variable, and wherein, to generate the suggested request, the one or more processors provide a value for the variable, wherein the value is associated with the user account.

Aspect 35. The method of Aspect 34, wherein execution the instructions by the one or more processors causes the one or more processors to further: generate the value for the variable using one or more trained machine learning models based on using the one of the plurality of valid requests as an input to the one or more trained machine learning models.

Aspect 36. The system of Aspect 35, wherein execution the instructions by the one or more processors causes the one or more processors to further: use the suggested request and the confirmation to update the one or more trained machine learning models.

Aspect 37. The method of Aspect 36, wherein execution the instructions by the one or more processors causes the one or more processors to further: identify the value within a second data structure.

Aspect 38. The system of Aspect 37, wherein execution the instructions by the one or more processors causes the one or more processors to further: identify the second data structure based on context associated with the partial request.

Aspect 39. The system of any of Aspects 37 to 38, wherein the value matches a previous value used in one or more previous actions performed using the user account.

Aspect 40. The system of any of Aspects 37 to 39, wherein the value is an account identifier corresponding to the user account, wherein the account identifier identifies at least one of an account type of the user account, an institution associated with the user account, and an alphanumeric code associated with user account.

Aspect 41. The system of any of Aspects 37 to 40, wherein the value is a secondary account identifier corresponding to a secondary account, wherein performing the action includes transferring funds between the user account and the secondary account, wherein the secondary account identifier identifies at least one of an account type of the secondary account, an institution associated with the secondary account, and an alphanumeric code associated with the secondary account.

Aspect 42. The system of any of Aspects 37 to 41, wherein the value is a numerical value, and wherein the second data structure identifies one or more previous transactions associated with the user account.

Aspect 43. The system of Aspect 42, wherein, to perform the action, the one or more processors transfer a quantity of an asset between the user account and a second account, the quantity of the asset based on the numerical value.

Aspect 44. The system of any of Aspects 26 to 43, wherein, to perform the action, the one or more processors determine a balance stored in the user account and output the balance.

Aspect 45. The system of any of Aspects 26 to 44, wherein, to perform the action, the one or more processors open the user account.

Aspect 46. The system of any of Aspects 26 to 45, wherein, to perform the action, the one or more processors close the user account.

Aspect 47. The system of any of Aspects 26 to 46, wherein, to perform the action, the one or more processors transfer one or more assets from the user account to a transferee account.

Aspect 48. The system of any of Aspects 26 to 47, wherein, to perform the action, the one or more processors transfer one or more assets from a transferor account to the user account.

Aspect 49. The system of any of Aspects 26 to 48, wherein determining the plurality of valid requests and generating the suggested request occur in real-time while still receiving at least a subset of the one or more characters of the partial request.

Aspect 50. The system of any of Aspects 26 to 49, wherein execution the instructions by the one or more processors causes the one or more processors to further: update at least one of the plurality of valid requests and the suggested request in real-time based on receipt of one or more edits to the partial request.

Aspect 51. A non-transitory computer readable storage medium having embodied thereon a program, wherein the program is executable by a processor to perform a method of context-aware caller redirection from a telephony environment to a messaging environment, the method comprising: receiving a partial request that includes one or more characters; parsing the partial request to identify the one or more characters; determine a plurality of valid requests that include the one or more characters of the partial request based on the partial request and based on a data structure; generating a suggested request by selecting one of the plurality of valid requests, the suggested request indicating an action to be performed; outputting the suggested request; receiving a confirmation associated with the suggested request; and performing the action indicated by the suggested request using a user account.

Aspect 52. The non-transitory computer-readable medium of Aspect 51, wherein the program is executable by the processor to further perform one or more operations of any of Aspects 2 to 25, and/or any of Aspects 27 to 50.

Aspect 53. An apparatus for context-aware account management, the apparatus comprising: means for receiving a partial request that includes one or more characters; means for parsing the partial request to identify the one or more characters; means for determining a plurality of valid requests that include the one or more characters of the partial request based on the partial request and based on a data structure; means for generating a suggested request by selecting one of the plurality of valid requests, the suggested request indicating an action to be performed using a user account; means for sending the suggested request; means for receiving a confirmation associated with the suggested request; and means for performing the action indicated by the suggested request using the user account.

Aspect 54. The apparatus of Aspect 53, further comprising means for performing one or more operations of any of Aspects 2 to 25, and/or any of Aspects 27 to 50.

What is claimed is:

1. A method of context-aware account management implemented using one or more processors, the method comprising:
   receiving a partial request that includes one or more characters;
   parsing the partial request to identify the one or more characters;
   determining a plurality of valid requests that include the one or more characters of the partial request based on the partial request and based on one or more data structures, wherein the one or more data structures also identify a plurality of different user asset accounts that are associated with a user and specific to the user, wherein the plurality of different user asset accounts are configured to store quantities of assets;
   generating, using the one or more processors, a suggested request by selecting a valid request of the plurality of valid requests and by identifying one or more values for one or more variables that are part of the valid request, wherein the one or more values identify one or more suggested user asset accounts of the plurality of different user asset accounts, wherein the suggested request indicates an action to be performed using the one or more suggested user asset accounts and identifies the one or more suggested user asset accounts, wherein the suggested request and the one or more variables are specific to the user;
   sending the suggested request;
   receiving a confirmation associated with the suggested request; and
   performing the action indicated by the suggested request using the one or more suggested user asset accounts.

2. The method of claim 1, wherein determining the plurality of valid requests based on the partial request and based on the one or more data structures includes:
   querying the one or more data structures for the one or more characters of the partial request; and
   receiving the plurality of valid requests that include the one or more characters of the partial request in response to querying the one or more data structures.

3. The method of claim 1, wherein determining the plurality of valid requests based on the partial request and based on the one or more data structures includes:
   generating the plurality of valid requests using one or more trained machine learning models based on using the partial request as an input to the one or more trained machine learning models, the one or more trained machine learning models having been trained based on information from the one or more data structures.

4. The method of claim 3, further comprising:
   using at least one of the suggested request or the confirmation to update the one or more trained machine learning models.

5. The method of claim 1, wherein receiving the partial request includes:
   receiving a voice recording recorded by a microphone; and
   generating the partial request at least in part by parsing the voice recording into the one or more characters.

6. The method of claim 1, wherein a user device associated with the user includes an input interface through which the partial request is received, wherein the input interface includes one or more buttons corresponding each of the one or more characters.

7. The method of claim 6, wherein each of the one or more buttons is a virtual button, wherein a touchscreen displays a button icon corresponding to the virtual button at a region of the touchscreen that receives a touch input corresponding to the virtual button using a touch-sensitive surface of the touchscreen.

8. The method of claim 1, wherein the one or more characters of the partial request form a string of text that includes one or more words, wherein the plurality of valid requests include each of the one or more words.

9. The method of claim 1, further comprising:
   generating the one or more values for the one or more variables using one or more trained machine learning models based on using an indication of the valid request as an input to the one or more trained machine learning models.

10. The method of claim 9, further comprising:
    using at least one of the suggested request or the confirmation to update the one or more trained machine learning models.

11. The method of claim 1, wherein identifying the one or more values for the one or more variables that are part of the valid request includes identifying the one or more values within at least a portion of an account management data structure of the one or more data structures, wherein at least the portion of the account management data structure is specific to the user.

12. The method of claim 11, further comprising:
    identifying the account management data structure based on context associated with the partial request.

13. The method of claim 1, wherein the one or more values matches one or more previous values associated with one or more previous actions performed using the one or more suggested user asset accounts.

14. The method of claim 1, wherein the one or more values include an account identifier corresponding to the one or more suggested user asset accounts, wherein the account identifier identifies at least one of an account type of the one or more suggested user asset accounts, an institution associated with the one or more suggested user asset accounts, or an alphanumeric code associated with one or more suggested user asset accounts.

15. The method of claim 1, wherein the one or more values include a secondary account identifier corresponding to a secondary asset account, wherein performing the action includes transferring funds between the one or more suggested user asset accounts and the secondary asset account, wherein the secondary account identifier identifies at least one of an account type of the secondary asset account, an institution associated with the secondary asset account, or an alphanumeric code associated with the secondary asset account.

16. The method of claim 1, wherein the one or more values include a numerical value that is based on one or more previous transactions associated with at least a subset of the plurality of different user asset accounts, and wherein the one or more data structures identify the one or more previous transactions associated with at least the subset of the plurality of different user asset accounts.

17. The method of claim 16, wherein performing the action includes transferring a quantity of an asset between the one or more suggested user asset accounts and a second asset account, the quantity of the asset based on the numerical value.

18. The method of claim 1, wherein performing the action includes determining a balance stored in the one or more suggested user asset accounts and outputting the balance.

19. The method of claim 1, wherein performing the action includes opening the one or more suggested user asset accounts.

20. The method of claim 1, wherein performing the action includes closing the one or more suggested user asset accounts.

21. The method of claim 1, wherein performing the action includes transferring one or more assets from the one or more suggested user asset accounts to a transferee asset account.

22. The method of claim 1, wherein performing the action includes transferring one or more assets from a transferor asset account to the one or more suggested user asset accounts.

23. The method of claim 1, wherein determining the plurality of valid requests and generating the suggested request occur in real-time while still receiving at least a subset of the one or more characters of the partial request.

24. The method of claim 1, further comprising:
    updating at least one of the plurality of valid requests and the suggested request in real-time based on receipt of one or more edits to the partial request.

25. A system for context-aware account management, the system comprising:
    one or more communication transceivers;
    one or more memory units storing instructions; and
    one or more processors, wherein execution the instructions by the one or more processors causes the one or more processors to:
      receive a partial request that includes one or more characters,
      parse the partial request to identify the one or more characters,
      determine a plurality of valid requests that include the one or more characters of the partial request based on the partial request and based on one or more data structures, wherein the one or more data structures also identify a plurality of different user asset accounts that are associated with a user and specific to the user, wherein the plurality of different user asset accounts are configured to store quantities of assets, generate, using the one or more processors, a suggested request by selecting a valid request of the plurality of valid requests and by identifying one or more values for one or more variables that are part of the valid request, wherein the one or more values identify one or more suggested user asset accounts of the plurality of different user asset accounts, wherein the suggested request indicates an action to be performed using the one or more suggested user asset accounts and identifies the one or more suggested user asset accounts, wherein the suggested request and the one or more variables are specific to the user, output the suggested request, receive a confirmation associated with the suggested request, and perform the action indicated by the suggested request using the one or more suggested user asset accounts.

26. The system of claim 25, wherein, to determine the plurality of valid requests based on the partial request and based on the one or more data structures, the one or more processors generate the plurality of valid requests using one or more trained machine learning models based on using the partial request as an input to the one or more trained machine learning models, the one or more trained machine learning models having been trained based on information from the one or more data structures.

27. The system of claim 26, wherein, to identify the one or more values for the one or more variables that are part of the valid request, the one or more processors are configured to identify the one or more values within at least a portion of an account management data structure of the one or more data structures, wherein at least the portion of the account management data structure is specific to the user.

28. The system of claim 25, wherein execution the instructions by the one or more processors causes the one or more processors to further:

query the one or more data structures for the one or more characters of the partial request, and receive the plurality of valid requests that include the one or more characters of the partial request in response to querying the one or more data structures.

29. The system of claim 25, wherein, to determine the plurality of valid requests based on the partial request and based on the one or more data structures, the one or more processors are configured to generate the plurality of valid requests using one or more trained machine learning models at least in part by using the partial request as an input to the one or more trained machine learning models, the one or more trained machine learning models having been trained based on information from the one or more data structures.

30. The system of claim 29, wherein execution the instructions by the one or more processors causes the one or more processors to further:

use at least one of the suggested request or the confirmation to update the one or more trained machine learning models.

31. The system of claim 25, wherein, to receive the partial request, the one or more processors are configured to:

receive a voice recording recorded by a microphone; and generate the partial request at least in part by parsing the voice recording into the one or more characters.

32. The system of claim 25, wherein a user device associated with the user includes an input interface through which the partial request is received, wherein the input interface includes one or more buttons corresponding each of the one or more characters.

33. The system of claim 32, wherein each of the one or more buttons is a virtual button, wherein a touchscreen displays a button icon corresponding to the virtual button at a region of the touchscreen that receives a touch input corresponding to the virtual button using a touch-sensitive surface of the touchscreen.

34. The system of claim 25, wherein the one or more characters of the partial request form a string of text that includes one or more words, wherein the plurality of valid requests include each of the one or more words.

35. The system of claim 25, wherein, to receive the partial request, the one or more processors are configured to:

generate the one or more values for the one or more variables using one or more trained machine learning models based on using an indication of the valid request as an input to the one or more trained machine learning models.

36. The system of claim 35, wherein, to receive the partial request, the one or more processors are configured to:

use at least one of the suggested request or the confirmation to update the one or more trained machine learning models.

37. The system of claim 25, wherein the one or more values matches one or more previous values associated with one or more previous actions performed using the one or more suggested user asset accounts.

38. The system of claim 25, wherein the one or more values include an account identifier corresponding to the one or more suggested user asset accounts, wherein the account identifier identifies at least one of an account type of the one or more suggested user asset accounts, an institution associated with the one or more suggested user asset accounts, or an alphanumeric code associated with one or more suggested user asset accounts.

39. The system of claim 25, wherein the one or more values include a secondary account identifier corresponding to a secondary asset account, wherein, to perform the action, the one or more processors are configured to transfer funds between the one or more suggested user asset accounts and the secondary asset account, wherein the secondary account identifier identifies at least one of an account type of the secondary asset account, an institution associated with the secondary asset account, or an alphanumeric code associated with the secondary asset account.

40. The system of claim 25, wherein the one or more values include a numerical value that is based on one or more previous transactions associated with at least a subset of the plurality of different user asset accounts, and wherein the one or more data structures identify the one or more previous transactions associated with at least the subset of the plurality of different user asset accounts.

41. The system of claim 40, wherein, to perform the action, the one or more processors are configured to transfer a quantity of an asset between the one or more suggested user asset accounts and a second asset account, the quantity of the asset based on the numerical value.

42. The system of claim 25, wherein, to perform the action, the one or more processors are configured to determine a balance stored in the one or more suggested user asset accounts and outputting the balance.

43. The system of claim 25, wherein, to perform the action, the one or more processors are configured to open the one or more suggested user asset accounts.

44. The system of claim 25, wherein, to perform the action, the one or more processors are configured to close the one or more suggested user asset accounts.

45. The system of claim 25, wherein, to perform the action, the one or more processors are configured to transfer one or more assets from the one or more suggested user asset accounts to a transferee asset account.

46. The system of claim 25, wherein, to perform the action, the one or more processors are configured to transfer one or more assets from a transferor asset account to the one or more suggested user asset accounts.

47. The system of claim 25, wherein determining the plurality of valid requests and generating the suggested request occur in real-time while still receiving at least a subset of the one or more characters of the partial request.

48. The system of claim 25, wherein execution the instructions by the one or more processors causes the one or more processors to further:
update at least one of the plurality of valid requests and the suggested request in real-time based on receipt of one or more edits to the partial request.

49. A non-transitory computer readable storage medium having embodied thereon a program, wherein the program is executable by one or more processors to perform a method of context-aware account management, the method comprising:
receiving a partial request that includes one or more characters;
parsing the partial request to identify the one or more characters;
determining a plurality of valid requests that include the one or more characters of the partial request based on the partial request and based on one or more data structures, wherein the one or more data structures also identify a plurality of different user asset accounts that are associated with a user and specific to the user, wherein the plurality of different user asset accounts are configured to store quantities of assets;
generating, using the one or more processors, a suggested request by selecting a valid request of the plurality of valid requests and by identifying one or more values for one or more variables that are part of the valid request, wherein the one or more values identify one or more suggested user asset accounts of the plurality of different user asset accounts, wherein the suggested request indicates an action to be performed using the one or more suggested user asset accounts and identifies the one or more suggested user asset accounts, wherein the suggested request and the one or more variables are specific to the user;
outputting the suggested request;
receiving a confirmation associated with the suggested request; and
performing the action indicated by the suggested request using the one or more suggested user asset accounts.

50. The system of claim 27, wherein execution the instructions by the one or more processors causes the one or more processors to further:
identify the account management data structure based on context associated with the partial request.

51. The non-transitory computer readable storage medium of claim 49, wherein determining the plurality of valid requests based on the partial request and based on the one or more data structures includes:
querying the one or more data structures for the one or more characters of the partial request; and
receiving the plurality of valid requests that include the one or more characters of the partial request in response to querying the one or more data structures.

52. The non-transitory computer readable storage medium of claim 49, wherein determining the plurality of valid requests based on the partial request and based on the one or more data structures includes:
generating the plurality of valid requests using one or more trained machine learning models based on using the partial request as an input to the one or more trained machine learning models, the one or more trained machine learning models having been trained based on information from the one or more data structures.

53. The non-transitory computer readable storage medium of claim 52, the method further comprising:
using at least one of the suggested request or the confirmation to update the one or more trained machine learning models.

54. The non-transitory computer readable storage medium of claim 49, wherein receiving the partial request includes:
receiving a voice recording recorded by a microphone; and
generating the partial request at least in part by parsing the voice recording into the one or more characters.

55. The non-transitory computer readable storage medium of claim 49, wherein a user device associated with the user includes an input interface through which the partial request is received, wherein the input interface includes one or more buttons corresponding each of the one or more characters.

56. The non-transitory computer readable storage medium of claim 55, wherein each of the one or more buttons is a virtual button, wherein a touchscreen displays a button icon corresponding to the virtual button at a region of the touchscreen that receives a touch input corresponding to the virtual button using a touch-sensitive surface of the touchscreen.

57. The non-transitory computer readable storage medium of claim 49, wherein the one or more characters of the partial request form a string of text that includes one or more words, wherein the plurality of valid requests include each of the one or more words.

58. The non-transitory computer readable storage medium of claim 49, the method further comprising:
generating the one or more values for the one or more variables using one or more trained machine learning models based on using an indication of the valid request as an input to the one or more trained machine learning models.

59. The non-transitory computer readable storage medium of claim 58, the method further comprising:
using at least one of the suggested request or the confirmation to update the one or more trained machine learning models.

60. The non-transitory computer readable storage medium of claim 49, wherein identifying the one or more values for the one or more variables that are part of the valid request includes identifying the one or more values within at least a portion of an account management data structure of the one or more data structures, wherein at least the portion of the account management data structure is specific to the user.

61. The non-transitory computer readable storage medium of claim 60, further comprising:
identifying the account management data structure based on context associated with the partial request.

62. The non-transitory computer readable storage medium of claim 49, wherein the one or more values matches one or more previous values associated with one or more previous actions performed using the one or more suggested user asset accounts.

63. The non-transitory computer readable storage medium of claim 49, wherein the one or more values include an account identifier corresponding to the one or more suggested user asset accounts, wherein the account identifier identifies at least one of an account type of the one or more suggested user asset accounts, an institution associated with the one or more suggested user asset accounts, or an alphanumeric code associated with one or more suggested user asset accounts.

64. The non-transitory computer readable storage medium of claim 49, wherein the one or more values include a secondary account identifier corresponding to a secondary asset account, wherein performing the action includes transferring funds between the one or more suggested user asset accounts and the secondary asset account, wherein the secondary account identifier identifies at least one of an account type of the secondary asset account, an institution associated with the secondary asset account, or an alphanumeric code associated with the secondary asset account.

65. The non-transitory computer readable storage medium of claim 49, wherein the one or more values include a numerical value that is based on one or more previous transactions associated with at least a subset of the plurality of different user asset accounts, and wherein the one or more data structures identify the one or more previous transactions associated with at least the subset of the plurality of different user asset accounts.

66. The non-transitory computer readable storage medium of claim 65, wherein performing the action includes transferring a quantity of an asset between the one or more suggested user asset accounts and a second asset account, the quantity of the asset based on the numerical value.

67. The non-transitory computer readable storage medium of claim 49, wherein performing the action includes determining a balance stored in the one or more suggested user asset accounts and outputting the balance.

68. The non-transitory computer readable storage medium of claim 49, wherein performing the action includes opening the one or more suggested user asset accounts.

69. The non-transitory computer readable storage medium of claim 49, wherein performing the action includes closing the one or more suggested user asset accounts.

70. The non-transitory computer readable storage medium of claim 49, wherein performing the action includes transferring one or more assets from the one or more suggested user asset accounts to a transferee asset account.

71. The non-transitory computer readable storage medium of claim 49, wherein performing the action includes transferring one or more assets from a transferor asset account to the one or more suggested user asset accounts.

72. The non-transitory computer readable storage medium of claim 49, wherein determining the plurality of valid requests and generating the suggested request occur in real-time while still receiving at least a subset of the one or more characters of the partial request.

73. The non-transitory computer readable storage medium of claim 49, further comprising:
updating at least one of the plurality of valid requests and the suggested request in real-time based on receipt of one or more edits to the partial request.

* * * * *